(12) United States Patent
Jung et al.

(10) Patent No.: US 10,447,080 B2
(45) Date of Patent: Oct. 15, 2019

(54) WEARABLE ELECTRONIC DEVICE INCLUDING COMMUNICATION CIRCUIT

(71) Applicant: Samsung Electronics Co., Ltd., Gyeonggi-do (KR)

(72) Inventors: Ik Su Jung, Gyeonggi-do (KR); Jong Hae Kim, Seoul (KR); Byoung Uk Yoon, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 197 days.

(21) Appl. No.: 15/056,136

(22) Filed: Feb. 29, 2016

(65) Prior Publication Data

US 2016/0254587 A1    Sep. 1, 2016

(30) Foreign Application Priority Data

Feb. 27, 2015  (KR) .......................... 10-2015-0028665
Aug. 12, 2015  (KR) .......................... 10-2015-0114121

(51) Int. Cl.
| | |
|---|---|
| *H02J 50/10* | (2016.01) |
| *H01Q 1/27* | (2006.01) |
| *H01Q 7/00* | (2006.01) |
| *H04B 5/00* | (2006.01) |
| *H02J 50/12* | (2016.01) |
| *H01Q 21/28* | (2006.01) |
| *H02J 7/02* | (2016.01) |

(52) U.S. Cl.
CPC ............. *H02J 50/10* (2016.02); *H01Q 1/273* (2013.01); *H01Q 7/00* (2013.01); *H01Q 21/28* (2013.01); *H02J 50/12* (2016.02); *H04B 5/0031* (2013.01); *H04B 5/0037* (2013.01); *H02J 7/025* (2013.01)

(58) Field of Classification Search
CPC ................................. H01Q 1/273; H02J 50/10
See application file for complete search history.

(56) References Cited

U.S. PATENT DOCUMENTS

| | | | | |
|---|---|---|---|---|
| 9,172,148 | B2 | 10/2015 | Lyons et al. | |
| 9,257,740 | B2 | 2/2016 | Lyons et al. | |
| 2006/0227058 | A1* | 10/2006 | Zellweger | H01Q 1/273 343/718 |
| 2012/0120772 | A1* | 5/2012 | Fujisawa | G04C 10/02 368/64 |
| 2013/0078917 | A1* | 3/2013 | Cho | H01Q 1/243 455/41.1 |
| 2014/0225786 | A1 | 8/2014 | Lyons et al. | |
| 2015/0311960 | A1* | 10/2015 | Samardzija | G06F 1/163 455/90.3 |

(Continued)

FOREIGN PATENT DOCUMENTS

| | | |
|---|---|---|
| JP | 2010217138 | 9/2010 |
| KR | 200286494 | 8/2002 |

*Primary Examiner* — Daniel Munoz
(74) *Attorney, Agent, or Firm* — The Farrell Law Firm, P.C.

(57) ABSTRACT

An electronic device is provided, including an external housing having a first surface and a second surface facing the opposite of first surface, a printed circuit board disposed in a space between the first surface and the second surface and forming a surface substantially parallel to the first surface, a display disposed between the first surface and the printed circuit board, an antenna pattern disposed between the display and the second surface; and at least one communication circuit electrically connected to the antenna pattern.

14 Claims, 37 Drawing Sheets

(56) References Cited

U.S. PATENT DOCUMENTS

| | | | |
|---|---|---|---|
| 2015/0349571 A1* | 12/2015 | Wagman | H02J 50/90 320/108 |
| 2016/0013544 A1 | 1/2016 | Lyons et al. | |
| 2016/0036120 A1* | 2/2016 | Sepanniitty | H01Q 1/243 343/702 |
| 2016/0049721 A1* | 2/2016 | Aizawa | H01Q 1/273 343/718 |
| 2016/0205229 A1* | 7/2016 | Vincent | H01Q 1/273 455/575.7 |
| 2017/0187096 A1* | 6/2017 | Hwang | H01Q 1/273 |

* cited by examiner

WEARABLE ELECTRONIC DEVICE INCLUDING COMMUNICATION CIRCUIT

PRIORITY

This application claims priority under 35 U.S.C. § 119(a) to Korean Patent Application No. 10-2015-0028665 filed in the Korean Intellectual Property Office on Feb. 27, 2015 and Korean Patent Application No. 10-2015-0114121 filed in the Korean Intellectual Property Office on Aug. 12, 2015, the entire disclosure of each of which is incorporated herein by reference.

BACKGROUND

1. Field of the Disclosure

The present disclosure relates to a wearable electronic device including a communication circuit.

2. Description of the Related Art

Use of portable electronic devices with communication functions has been increasing amongst many people. In recent years, types of such electronic devices have been evolving to include wrist appliances or wearable forms of electronic devices. External shapes of such electronic devices are diversified into many styles. Thus, it is necessary to prepare various types of components of such wearable electronic devices in various locations and/or patterns.

Near field communication (NFC) circuits, for example, are generally disposed at rear sides of electronic devices. As the frequency characteristics of NFC are weak in wavelength transmittance, NFC circuits are generally disposed at the outermost sides of electronic devices. Due to functional degradation by interference with other communication circuits, NFC circuits are generally placed far from the front sides of electronic devices. For that the above reasons, the NFC circuits are usually disposed in rear cases or battery compartments of electronic devices.

However, placing NFC circuits in such locations may be inconvenient for users of wearable electronic devices. For example, when an NFC circuit is placed at a rear side of a smart watch, a user may be required to take the smart watch off the user's wrist whenever using NFC functions of the smart watch.

SUMMARY

The present disclosure has been made to address at least the above-described problems and/or disadvantages and to provide at least the advantages described below. Accordingly, an aspect of the present disclosure is to provide a wearable electronic device allowing a user to use NFC while having the wearable electronic device on his wrist.

Another aspect of the present disclosure is to provide a wearable electronic device allowing wireless communication using other communication circuits.

Still another aspect of the present disclosure is to provide a wearable electronic device allowing wireless charge using a second communication circuit. To this end, the wearable electronic device may be equipped with the second communication circuit at a position free from functional degradation due to interference with NFC.

In accordance with an aspect of the present disclosure, an electronic device is provided. The electronic device includes an external housing including a first surface and a second surface facing the opposite of first surface; a printed circuit board disposed in a space between the first surface and the second surface and forming a surface substantially parallel to the first surface; a display disposed between the first surface and the printed circuit board; an antenna pattern disposed between the display and the second surface; and at least one communication circuit electrically connected to the antenna pattern.

BRIEF DESCRIPTION OF THE DRAWINGS

The above and other aspects, features, and advantages of embodiments of the present disclosure will be more apparent from the following detailed description when taken in conjunction with the accompanying drawings, in which.

DETAILED DESCRIPTION

Figure 1A:
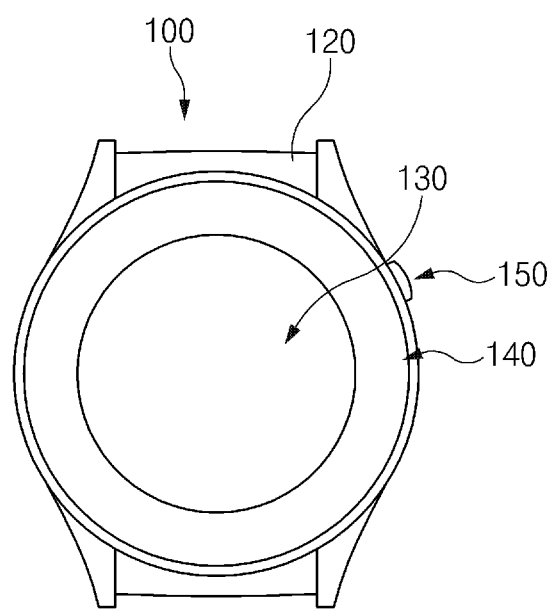
FIG. 1A is a front diagram illustrating a wearable electronic device according to an embodiment of the present disclosure.

Embodiments of the present disclosure are described in conjunction with the accompanying drawings. The same or similar components may be designated by the same or similar reference numerals although they may be illustrated in different drawings. Detailed descriptions of constructions or processes known in the art may be omitted to avoid obscuring the subject matter of the present disclosure.

The expressions "have", "may have", "include", "may include", "comprise", and "may comprise", as used herein, indicate the existence of corresponding features (e.g., numerical values, functions, operations, or components), but do not exclude the presence of additional features.

As used herein, the expressions "A or B", "at least one of A or/and B", and "one or more of A or/and B" may include all allowable combinations that are enumerated together. For example, the expressions "A or B", "at least one of A and B", and "at least one of A or B" may indicate a case including at least one A, a case including at least one B, and/or a case including both at least one A, and at least one B.

As used herein, expressions such as "1st", "2nd", "first", "second", etc., may be used to qualify various elements regardless of their order and/or priority, simply differentiating one from another, but do not limit those elements thereto. For example, both a "first user device" and a "second user device" indicate different user devices. For example, a first element may be referred to as a second element and vice versa without departing from the scope of the present disclosure.

As used herein, if one element (e.g., a first element) is referred to as being "operatively or communicatively connected with/to" or "connected with/to" another element (e.g., a second element), the first element may be directly coupled with the second element, or connected with the second element via an intervening element (e.g., a third element). However, if one element is referred to as being "directly coupled with/to" or "directly connected with/to" with another element, there is no intervening element (e.g., a third element) existing between the first and second elements.

Herein, the expression "configured to" (or "set to") is interchangeable with "suitable for", "having the capacity to", "designed to", "adapted to", "made to", and "capable of", and may not simply indicate "specifically designed to". Alternatively, in some circumstances, the expression "a device configured to" perform an operation may indicate that the device may do the operation alone or together with other devices or components. For instance, a term "a processor configured to (or set to) perform A, B, and C" may refer to a generic-purpose processor (e.g., CPU or application processor) capable of performing its relevant operations by executing one or more software or programs that are stored in an exclusive processor (e.g., an embedded processor), which is prepared for the operations, or in a memory.

The terms used herein are merely used to describe embodiments of the present disclosure, and are not be intended to limit the scope of the present disclosure. Herein, terms of a singular form may include plural forms unless otherwise specified. Unless otherwise defined herein, all terms used herein, which include technical or scientific terms, may have the same definition that is generally understood by a person skilled in the art. It will be further understood that terms, which are defined in a dictionary and commonly used, should also be interpreted according to customary definitions in the related art and not according to idealized or overly formal definitions, unless expressly so defined herein, in according to embodiments of the present disclosure: In some cases, terms, even when defined herein, may not be interpreted in a manner that embodiments of the present disclosure.

According to an embodiment of the present disclosure, a wearable device may include at least one of accessories (e.g., watches, rings, bracelets, anklets, necklaces, classes, contact lenses, or head-mounted devices (HMDs)), integrated textiles or clothes (e.g., electronic clothes), body-attachable devices (e.g., skin pads or tattoos), or implantable devices (e.g., implantable circuits).

Hereinafter, electronic devices according to embodiments of the present disclosure will be described in conjunction with the accompanying drawings.

Figure 1B:
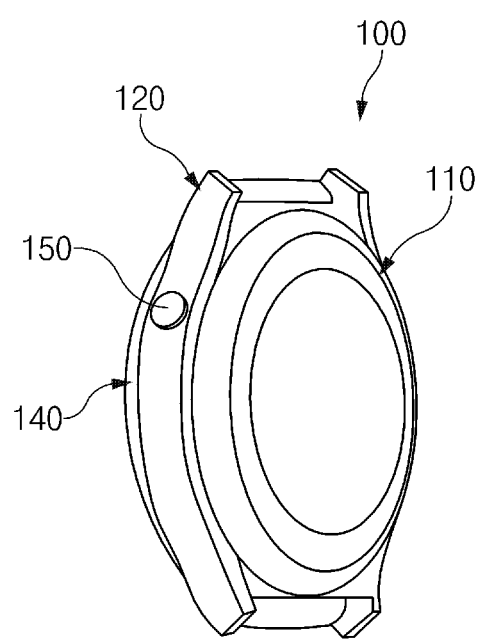
FIG. 1B is a perspective diagram schematically illustrating a contour of a wearable electronic device according to an embodiment of the present disclosure.

FIG. 1A is a front diagram illustrating a wearable electronic device according to an embodiment of the present disclosure, and FIG. 1B is a perspective diagram schematically illustrating a contour of a wearable electronic device according to an embodiment of the present disclosure. The electronic device of FIGS. 1A and 1B described below is a wearable electronic device in a form of watch. However, an electronic device according to an embodiment of the present disclosure may include a wearable or handheld device applicable to diverse positions, e.g., a ring, bracelet, necklace, or belt.

Referring to FIGS. 1A and 1B, a wearable electronic device 100 according to an embodiment of the present disclosure includes a cover housing 110, a body case 120, a display part 130, a bezel wheel 140, and a key assay 150. The wearable electronic device 100 may further include a wearing module that is combined with the cover housing 110 to fix the wearable electronic device 100 on a user's wrist. The wearing module may include, for example, two band-shaped wearing parts respectively combined with both edges. The wearing parts may be prepared in an intercombinable structure and may have a variable length according to positions at which the band-shaped wearing parts are placed together to be worn by a user.

The cover housing 110 includes a space for elements (e.g., the display part 130) of the wearable electronic device 100 in the center, and a sidewall enclosing the space. In the cover housing 110, the space may be shaped as an oval (or a circle), thereby allowing elements at least of a part of which having a corresponding shape, to be disposed in the center. Additionally, at a side of the cover housing 110, joint parts extending outward a circular brim may be disposed to allow sides of the wearing parts to attach to a side of the cover housing 110. The joint parts may be symmetrically disposed with vertical or horizontal symmetry on the center of the space included in the cover housing 110. The cover housing 110 may be made of, for example, a nonconductive material. Alternatively, the cover housing 110 may be made of a metallic material and an area that connects with the body case 120 may be made of a nonmetallic material. Alternatively, an area of the cover housing 110, which is combined with the body case 120, may be coated by a nonmetallic material.

The body case 120 may protect elements (e.g., the display part 130, a battery, or a PCB) of the wearable electronic device 100 that are combined with the cover housing in the wearable electronic device 100. The body case 120 may have a through hole with a specific size in a center thereof to form an opening part. A size of the through hole may determine a size of an exposed region of the display part 130. The body case 120 may include a peripheral part forming the through hole, and a sidewall disposed in a manner that encloses the through hole in the vertical or a specific angle to the peripheral part. The sidewall of the body case 120 may be disposed opposite to the sidewall of the cover housing 110.

Figure 2:
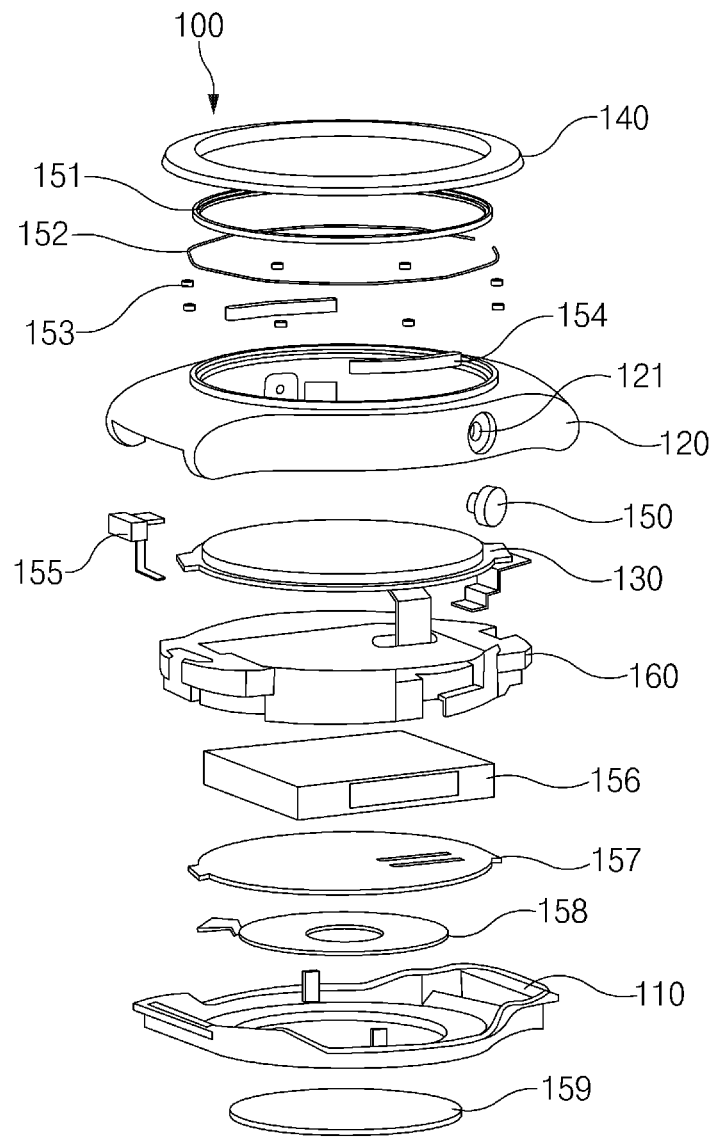
FIG. 2 is an explosive perspective diagram illustrating a wearable electronic device according to an embodiment of the present disclosure.

The body case 120 may include band-shaped projection parts that enclose a circumference of the through hole and extend in certain heights (e.g. about the heights of the bezel wheel 140). Accordingly, the band-shaped projection parts may be connected to the bezel wheel 140. As shown in FIG. 2, at a side of the body case 120, a combination hole 121 may have a shape and position for receiving the key assay 150. A position of the combination hole 121 is illustrated as being relatively close to an area where the wearing module is combined. The combination hole 121 may be placed in various locations according to disposition of the key assay 150. The number of the key assays 150 may be also vary along with a number of corresponding combination holes 121.

Referring back to FIGS. 1A and 1B, At least a part of the body case 120, for example, may be made of a metallic material. Such a metallic body case 120 may perform an antenna function. For example, the body case 120 may connect to a communication circuit mounted on a PCB settled therein, and may transmit a specific signal. According to an embodiment of the present disclosure, the body case 120 may be used as a partial antenna of a specific communication circuit. For example, the body case 120 may be used for at least a part of antenna in a second generation (2G), third generation (3G), or fourth generation (4G) communication circuit. Otherwise, the body case 120 may be used for at least a part of antenna in an NFC communication circuit, a magnetic secure transmission (MST) circuit, or a Bluetooth communication circuit. In regard to usage of the metallic body case 120 as an antenna, at least one point of an inner sidewall of the body case 120 may be in contact with a feeding part of the aforementioned communication circuit.

According to an embodiment of the present disclosure, an MST circuit, as a circuit for transmitting data in a magnetic stripe mode, may transmit touchless information. According to an embodiment of the present disclosure, an MST circuit may receive a control signal and payment information from an internal control circuit of an electronic circuit. An MST circuit may convert payment information into a magnetic signal and may transmit the magnetic signal. For example, an MST circuit may generate a magnetic signal that is the same as a signal generated when a magnetic stripe of a credit card is swiped through a card reader. Payment information transmitted by an MST circuit may be identified in a general card reader. An MST circuit may provide payment information to a card reader through simplex communication.

The display part 130 may be at least partly exposed to an exterior of the electronic device 100 through the through hole of the body case 120. For example, the display part 120 may include a touch display panel and a window part (e.g., a glass part) covering a part of the touch display panel. A part (e.g., a window) of the display part 120 may be exposed towards an exterior of the electronic device 100 through the through hole of the body case 120. The display part 130 may have a shape corresponding to a pattern of the through hole, for example, a circle. The display part 130 may include an area exposed through the through hole, and an area settled in the body case 120. The display part 130 may be equipped with a touch screen and a display panel therein. Additionally, the display part 130 may be equipped with an NFC or an MST antenna (or an NFC or an MST coil) therein. Accordingly, the display part 130 may be equipped with projected signal lines for, e.g., a flexible printed circuit board (FPCB), signal supply of the display panel at the outer circumference of the circular plate, for signal supply of the touch screen, for NFC or MST signal transmission and reception, and for grounding. The display part 130 may be configured in various types such as LCD, OLED, and so on.

In the display part 130, at least a part of area (e.g., a driver integrated circuit (IC) for display panel operation) may connect to the signal line for grounding. The signal line for grounding at least a part of the display part 130 may be electrically connected with a main circuit board and may act as the ground of the main circuit board. Otherwise, the signal line for grounding at least a part of the display part 130 may be electrically connected with a ground terminal of a communication circuit disposed on a main circuit board and may act as the ground of the communication circuit. One end of the signal lines may be fixed to a side of a bracket, which is described later herein.

The bezel wheel 140 may be disposed around the through hole of the body case 120. The bezel wheel 140 may be rotatably connected to projection parts, which are formed around the through hole of the body case 120. The bezel wheel 140 may be formed in a band whose center is hollow. The bezel wheel 140 may be slightly isolated from the front of the body case 120. At least a part of the bezel wheel 140 may be made of ceramic or poly-carbonate (PC) material. An outer part of the bezel wheel 140 may be made of a metallic material such as iron, aluminum, or a metallic alloy. The inner and outer parts of the bezel wheel 140 may be integrated in one body or may be strongly combined each other. A signal may be radiated through the body case 120, which acts as the antenna via the inner part of the bezel wheel 140, which is made of a nonconductive material.

The key assay 150 may include, for example, a header part and a projection vertically extending from the center of the header part. The upper surface of the header part may be equipped with at least a unidirectional groove, e.g., a linear groove. The upper surface of the header part may be shaped in a convex disk. A side of the header part may be equipped with a pattern groove to increase a frictional force against a matter in contact therewith while the header part is being held or rotating. The key assay 150 may be fixedly inserted into the combination hole 121, which is disposed in the body case 120.

As described above, the wearable electronic device 100 according to embodiments of the present disclosure may be disposed to use at least a part of the metallic body case 120 as an antenna of the communication circuit mounted thereon. In regard to usage of the metallic body case 120 as an antenna, the wearable electronic device 100 may include a nonmetallic or nonconductive cover housing 110 that is combined with the body case 120 and touched on a user's skin but disallow the body case 120 to be in contact with the user's skin. Additionally, the wearable electronic device 100 may provide a contact element for stably supporting electrical contact with the main circuit board on which a communication circuit equipped with the body case 120 is mounted.

According to embodiments of the present disclosure, the wearable electronic device 100 may be shaped substantially as a circle, including a display part, a front interface providing a user input part (e.g., a key assay and a touch-type display part), a body case having a similar shape as the display part and contoured for accommodating space for internal elements, a cover housing shielding the accommodation space at the read side of the wearable electronic device and being adhesively close to or in contact with a user, and a wearing part connected to the body case and worn on the user. Additionally, a bezel area including diverse input/output function parts may be disposed adjacent to the circumference of the display part. The bezel area may be structured as a wheel that is rotatable to perform a variety of functions. The circumference of the body case 120 may include a push button usable for an input unit, or a rotatable dragon-headed button (e.g., key assay). Additionally, one end of the wearing part may further include a buckle part that may be connected to the other end of the wearing part. The other end of the wearing part, which is connected to the buckle part, may further include a pattern, such as a hole, projection, or groove for connecting to the buckle part.

FIG. 2 is an explosive perspective diagram illustrating a wearable electronic device 100 according to an embodiment of the present disclosure.

Referring to FIG. 2, the wearable electronic device 100 includes a bezel wheel 140, a friction control ring 151, a fixing wire 152, a wheel magnet 153, a front magnet 154, a body case 120, a key assay 150, a display part 130, an optical finger mouse (OFM) sensor 155, a bracket 160, a battery 156, a main circuit board 157, a cover housing 110, a wireless charging part 158, and a rear deco 159. The wearable electronic device 100e, as well as main elements such as an opening part of the body case 120, the cover housing 110, the bracket 160, the display part 130, and the main circuit board 157, may have a shape similar to a circle.

The bezel wheel 140 may be rotatably installed around a center opening part (or through hole) of the body case 120. The bezel wheel 140 may further include a magnet or gear structure to provide mobility. The bezel wheel 140 may be made up with diverse materials, such as ceramic, for solidity or design facility. Additionally, a side of the bezel wheel 140 may include carvings for indicating various functions. Additionally, a side of the bezel wheel 140 includes an OFM sensor 155 for converting a rotation of wheel into an input.

The friction control ring 151 may be disposed in the bezel wheel 140 to support the bezel wheel 140. Additionally, the friction control ring 151 may be in contact with the bezel wheel 140 and may reduce a friction force that is generated during a rotation of the bezel wheel 140. The friction control ring 151 may be made of a material that has a relatively low friction coefficient or may be surfaced to lower its friction coefficient.

The fixing wire 152 may fix the friction control ring 151, such that the friction control ring 151 does not to rotate along the bezel wheel 140. The fixing wire 152 may be disposed between the friction control ring 151 and the circumference of the through hole of the body case 120.

The wheel magnet 153 may be disposed at a side of the body case 120. The side of the body case 120 may include a fixing groove into which at least one wheel magnet 153 is fixedly inserted. If the wheel magnet 153 is fixed to the fixing home, at least a part of the wheel magnet 153 may be disposed with a specific gap from the bezel wheel 140, which is made of a metallic material. As the wheel magnet 153 faces with the bezel wheel 140 to cause magnetic attraction to the bezel wheel 140, the wheel magnet 153 may allow a user to feel movement while the bezel wheel 140 is rotating along the surface of the body case 120. The wheel magnet 153 may be isolated at a specific interval from the circumference of the through hole of the body case 120.

The front magnet 154 may be disposed between the body case 120 and the fixing wire 152. The front magnet 154, for example, may have a specific length and may be fixedly disposed at a side of the body case 120. A side of the body case 120 may include a groove into which the front magnet 154 is fixedly inserted. The front magnet 154 may act to hold the fixing wire 152 and may apply magnetic attraction to the bezel wheel 140 to improve movement of the bezel wheel 140.

The body case 120, as described above, may have the through hole (or an opening part) at a center thereof, and may be shaped as a circle to enclose the through hole. Additionally, the body case 120 may have a uniform width along the circular circumference, and may include an upper end and a lower end that are opposite each other on a direction intersecting the center of the through hole. The body case 120 may be made of a metallic material for an antenna. Accordingly, a size, a shape, and a curvature of the body case 120 may vary according to communication properties of the communication circuit. A window housing may be disposed in the through hole of the body case 120. To provide a circular shape of the display part 130, the window housing may include an outer surface part (e.g., upper end glass or outer glass) and an inner surface part (e.g., lower end glass or inner glass). The outer surface part and the inner surface part may be made of a transparent material (e.g., glass or plastic) in order to expose the display part 130 towards an exterior of the electronic device 100.

The key assay 150 may be fixedly inserted into the combination hole 121 which is formed at a side of the body case 120. The key assay 150 may be formed to rotate. In the case that the key assay 150 rotates, the wearable electronic device 100 may detect and convert the rotation into an input signal. Although the key assay 150 and the combination hole 121 are illustrated in one member, embodiments of the present disclosure are not limited to one member. For example, a plurality of pairs of key assays 150 and combination holes 121 may be each allocated with different signals.

The display part 130 may be disk-shaped. A window housing may be disposed on top of the display part 130 to protect the display part 130. Signal lines (e.g., touch-screen signal lines, display-panel signal lines, etc.) may be included in the electronic device 100 to drive the display part 130. Those signal lines may be electrically connected with the main circuit board 157 through a side part of the bracket 160.

The OFM sensor 155 may be fixed to a side of the bracket 160 and may detect a rotation of the bezel wheel 140 which is settled in the body case 120. A sensor signal collected by the OFM sensor 155 may be transferred to the main circuit board 157 and then may be used for an input signal according to movement of the bezel wheel 140.

A side of the bracket 160 may include a settling part in which the battery 156 is settled and the other side of the bracket 160 may provide areas for the main circuit board 157. The bracket 160 on which the main circuit board 157 is stacked may be formed of a non-conductive material. The bracket 160 may be formed with steps, and thereby the battery 156 and the main circuit board 157 may be sequentially stacked in the stepped interior. The other side of the bracket 160 may include a rear part of the display part 130. According to an embodiment of the present disclosure, a side of the bracket 160 may include line disposition grooves that accommodate at least one of the signal lines disposed in the display part 130. The signal lines disposed in the display part 130 may be electrically connected to the main circuit board 157 through the line disposition grooves of the bracket 160.

According to an embodiment of the present disclosure, a side of the bracket 160 may provide at least one contact element or a connection circuit including a contact element. A side of the bracket 160 may include at least one circuit disposition groove. At least one contact element or a connection circuit including a contact element, which is disposed in the circuit disposition groove, may electrically connect the bezel wheel 140 with the main circuit board 157.

The bracket 160 may further include, for example, other assembled structures such as an antenna contact, a motor, a sensor, or an FPCB.

The battery 156 may be wholly or partly shaped likely in a circle for spatial efficiency. In regard to this, the battery 156 may include a battery protection circuit module (PCM), which is wholly or at least partly formed in a circle, or may be shaped in an arc by diversifying a folding mode with an internal jellyroll structure or a package pattern. Additionally, the battery 156 may maximize its capacity on the settlement in the bracket 160 with steps by paralleling a PCM to a battery cell arrangement direction or by scaling down stacks of an internal jellyroll structure.

Diverse circuits may be installed on the main circuit board 15 in order to process signals of the wearable electronic device 100. For example, the main circuit board 157 may include a processor involved in an operation of the display part 130, a processor involved in an operation of a communication circuit, and/or a processor for processing signals of input units (e.g., the bezel wheel 140, the key assay 150, and the display part 130). Additionally, the main circuit board 157 may include a communication circuit (e.g., a mobile communication circuit for 3G or 4G, a Bluetooth communication circuit, or a WiFi direct communication circuit). At least a part of the antenna supporting the communication circuit may include the body case 120 as described above. Accordingly, the main circuit board 157 may include contact terminals that are electrically connected with at least one contact element electrically connected with the body case 120 or that are electrically connected with a connection circuit including a contact element.

The cover housing 110 may be combined with the body case 120. The wireless charging part 158, the main circuit board 157, and the battery 156 may be provided in the cover housing 110. A lower side of the bracket 160, where the display part 130 is disposed, may be positioned at a side of the cover housing 110. The cover housing 110 may further include a hybrid structure with glass or ceramic for design differentiation and diverse sensor interface areas. The cover housing 110 may further include a structure, such as a metallic plate or hook, for installing a cradle during charging of the electronic device 100. The cover housing 110 may be joined with the body case 120 through a screw, snap-fit, boding, tape, or soldering. At positions where elements of the cover housing 110 are disposed, a sealing member or structure may be further provided for waterproof.

The wireless charging part 158 may receive wirelessly transmitted energy, and may transfer the received wirelessly transmitted energy to the battery 156 either directly or through the main circuit board 157. The wireless charging part 158 may be disposed between the cover housing 110 and the rear deco 159. The wireless charging part 158 may be shaped, for example, in a hollow band, as illustrated, may transfer a current, which is induced from wireless energy supplied from the external, to the battery 156. According to another embodiment of the present disclosure, the wireless charging part 158 may be disposed even between the main circuit board 157 and the cover housing 110.

The rear deco 159 may be provided to close an opening part of the cover housing 110 and to prevent the wireless charging part 158 from separation. Accordingly, the rear deco 159 may be disposed at a rear part of the electronic device 100 (or a groove provided in the cover housing 110). To cover an opening part of the cover housing 110, the rear deco 159, for example, may be formed larger than the opening part of the cover housing 110. Although the rear deco 159 is illustrated as a disk, an embodiment of the present disclosure may not be restrictive hereto. For example, the rear deco 159 may be formed in various shapes such as polygons. The rear deco 159 may be made of a material such as ceramic for providing an improved texture in contact with a user's skin.

As described above, the wearable electronic device 100, according to an embodiment of the present disclosure, may electrically connect the main circuit board 157, which includes a communication circuit using the body case 120 as at least a part of antenna, with the body case 120.

As described above, the wearable electronic device 100 may include an upper glass, an antenna pattern, a PCB, a wireless charging pattern, and a lower glass. The upper glass may be an outer glass included in the display part 130 and the antenna pattern may be also included in the display part 130. The PCB may correspond to the main circuit board 157, the wireless charging pattern may correspond to the wireless charging part 158, and the lower glass may correspond to the rear deco 159.

Figure 3A:
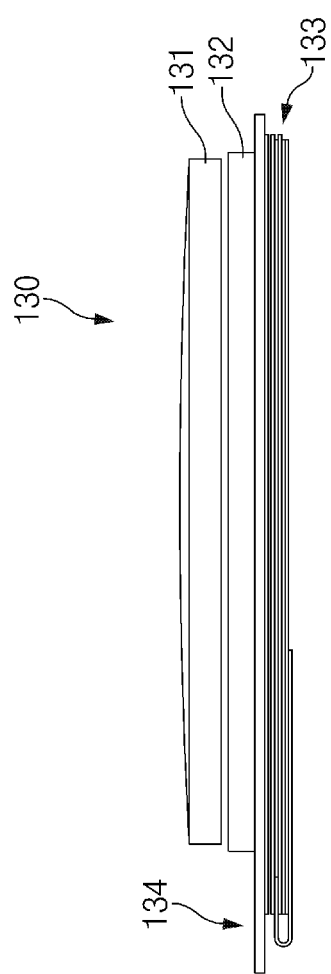
FIG. 3A is a side diagram illustrating a display part according to an embodiment of the present disclosure.
Figure 3B:
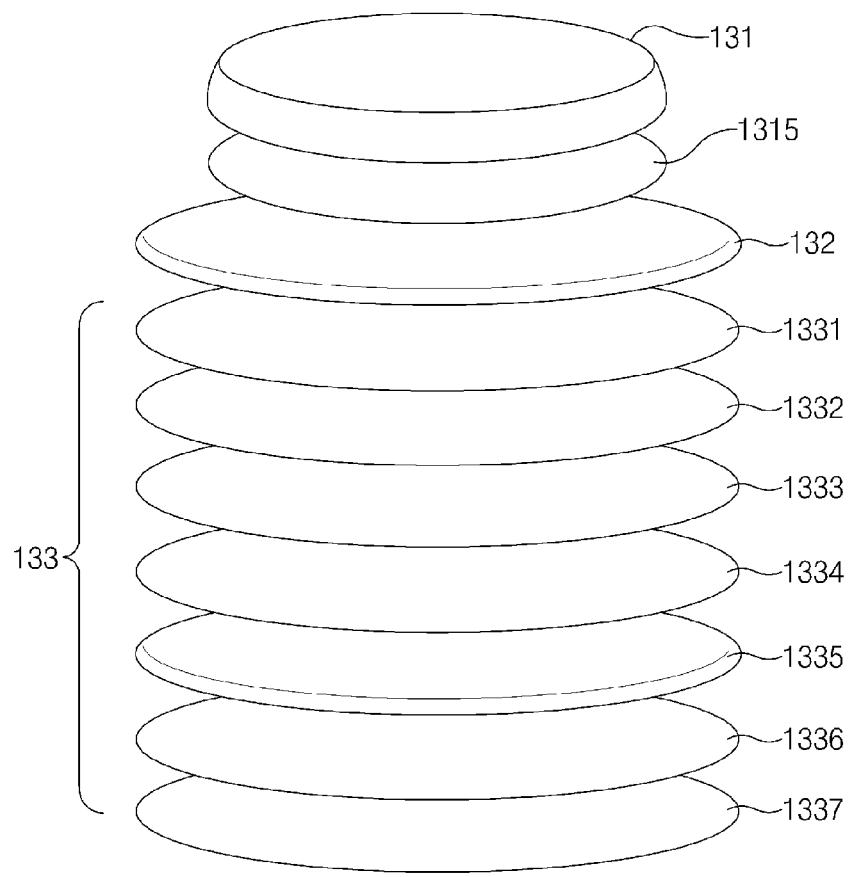
FIG. 3B is an explosive perspective diagram illustrating a display part according to an embodiment of the present disclosure.
Figure 3C:
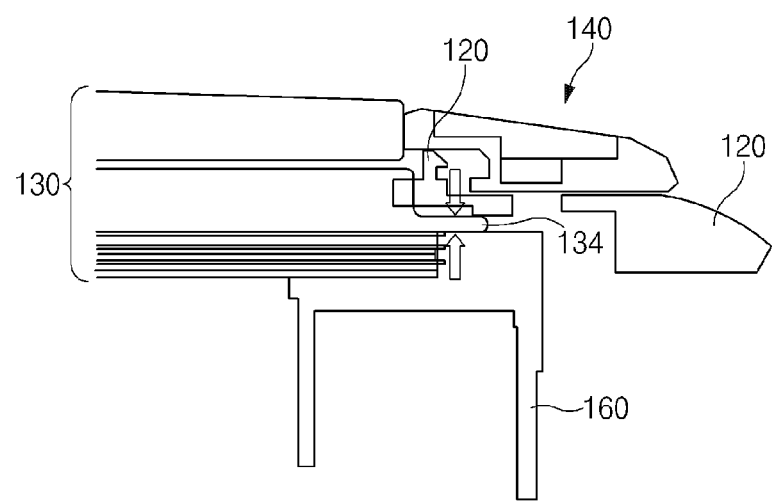
FIG. 3C is a sectional diagram illustrating a display part disposed in a wearable electronic device of the present disclosure.

FIG. 3A is a side diagram illustrating a display part of an electronic device according to an embodiment of the present disclosure. FIG. 3B is an explosive perspective diagram illustrating a display part according to an embodiment of the present disclosure. FIG. 3C is a sectional diagram illustrating a display part disposed in a wearable electronic device 100 of the present disclosure.

Referring to FIG. 3A, the display part 130 includes an outer glass 131, an inner glass 132, and a plurality of layers attachable to the inner glass 132. According to an embodiment of the present disclosure, in order to provide a complete circular display and user interface (UI), the display part 130 may be formed in a dual window structure with the outer glass 131 and the inner glass 132. The outer glass 131, which form most of the contour of the display part 130, may be variable in design by adding diverse curvatures and post-processing processes, and the inner glass 132 may be provided as a base plate that accommodates diverse sensors such as touch sensor.

Referring to FIG. 3B, the display part 130 includes an outer glass 131, a lamination layer 1315, an inner glass 132, a first adhesive sheet (T-type optical clear adhesive (T-OCA)) 1331, a touch film 1332, a second adhesive sheet (M-type optical clear adhesive (M-OCA)) 1333, a polarizer (POL) film 1334, a display panel 1335, a near-field communication circuit 1336, and an FPCB 1337.

According to an embodiment of the present disclosure, the near-field communication circuit 1336 may be an NFC or MST antenna (e.g., an NFC or MST coil), or a Bluetooth antenna. Herein, the near-field communication circuit 1336 will also be referred to as an NFC antenna. The wearable electronic device 100 may be used as means for diverse authentications or payments through the NFC antenna.

Additionally, since the NFC antenna is placed in a body case 120 of the wearable electronic device 100, the wearable electronic device 100 may perform NFC by rendering the body case 120 or the outer glass 1310 such that the NFC antenna is able to come into close contact with an NFC tag.

A method of performing the NFC communication is described later herein, with reference to FIG. 6.

Returning to FIG. 3A, according to an embodiment of the present disclosure, the display part 130 includes a flange structure 134 that is formed in the inner glass 132. The flange structure 134 may be even formed as a layer in the inner glass 132 and may be integrated into a single body with the inner glass 132. Referring to FIG. 3C, the display part 130 may be supported by a bracket 160 through the flange 134 and may be fixed by the body case 120. For example, when a cover housing 110 is combined with the body case 120, the bracket 160 combined with the cover housing 110 may support the flange structure or the adjacent area 134 (hereinafter, referred to as "flange structure 134" for convenience of description) by its upper part, and the body case 120 may press down the flange structure 134 to fix the flange structure 134 and the display part 130, which is laminated with the flange structure 134.

As the display part 130 is fixed in the wearable electronic device 100, the near-field communication circuit 1336 may also be fixed in the wearable electronic device 100. Accordingly, since the near-field communication circuit 1336 maintains the interval, which is set at the time of releasing the wearable electronic device 100, from other communication circuits (e.g., a cellular communication circuit or a WiFi communication circuit) and maintains its original radial pattern as well, the near-field communication circuit 1336 may be able to secure a stable communication yield.

Figure 4:
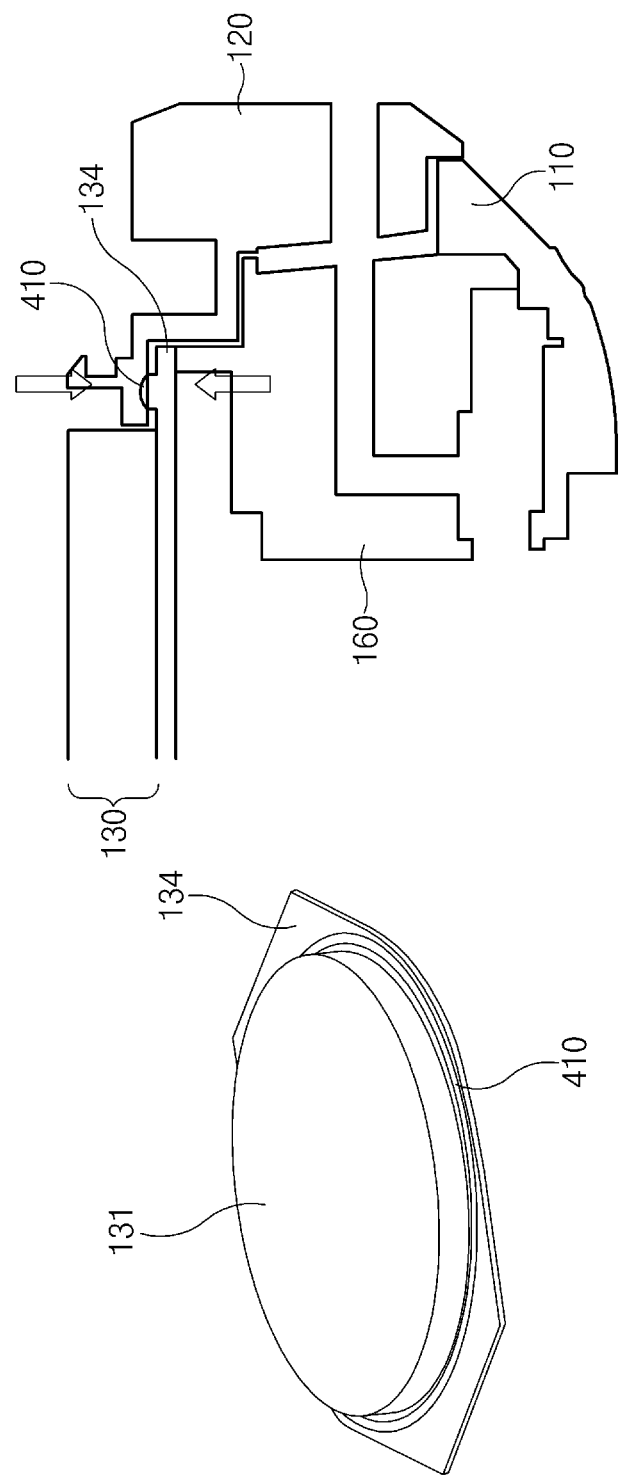
FIG. 4 is a diagram illustrating a waterproof structure of a wearable electronic device according to an embodiment of the present disclosure.

FIG. 4 is a diagram illustrating a waterproof structure of a wearable electronic device according to an embodiment of the present disclosure.

In contrast to other portable electronic devices, the wearable electronic device 100 is commonly exposed to water. For example, when the wearable electronic device 100 is worn while a user is exercising (e.g., jogging, hiking, or cycling), the user's sweat may flow into the wearable electronic device 100. Additionally, when a user is washing his hands or face, water can infiltrate the wearable electronic device 100. On rainy days, the wearable electronic device 100 can become wet.

An outer glass 131, an inner glass 132, and a plurality of layers 133 may be laminated into an integrated structure. An integrated display part 130 may be positioned and supported in the above-described set of components through a flange structure 134 formed around the inner glass 132. In this configuration, the flange structure 134 of the display part 130 may include diverse waterproof structure.

The left-most illustration of FIG. 4 is a perspective view of the display part 130. According to an embodiment of the present disclosure, a dispenser 410 may be provided on the flange structure 134.

The right-most illustration of FIG. 4 is a sectional view of the display part 130 disposed in the wearable electronic device 100. The dispenser 410 is placed on the flange structure 134. According to an embodiment of the present disclosure, when a cover housing 110 is joined together with a body case 120, the body case 120, the flange structure 134, and a bracket 160 may be stacked, and the dispenser 410 of rubber placed between the body case 120 and the flange structure 134 may be pressed to a specific degree to accomplish waterproof functionality. According to another embodiment of the present disclosure, the wearable electronic device 100 may further include a waterproof structure that is equipped with dispensers between the cover housing 110 and the bracket 150, as well as between the body case 120 and the flange structure 134.

Additionally, according an embodiment of the present disclosure, the wearable electronic device 100 may form a waterproof structure by a waterproof tape or waterproof liquid solution, as well as by the dispenser 410.

Figure 5:
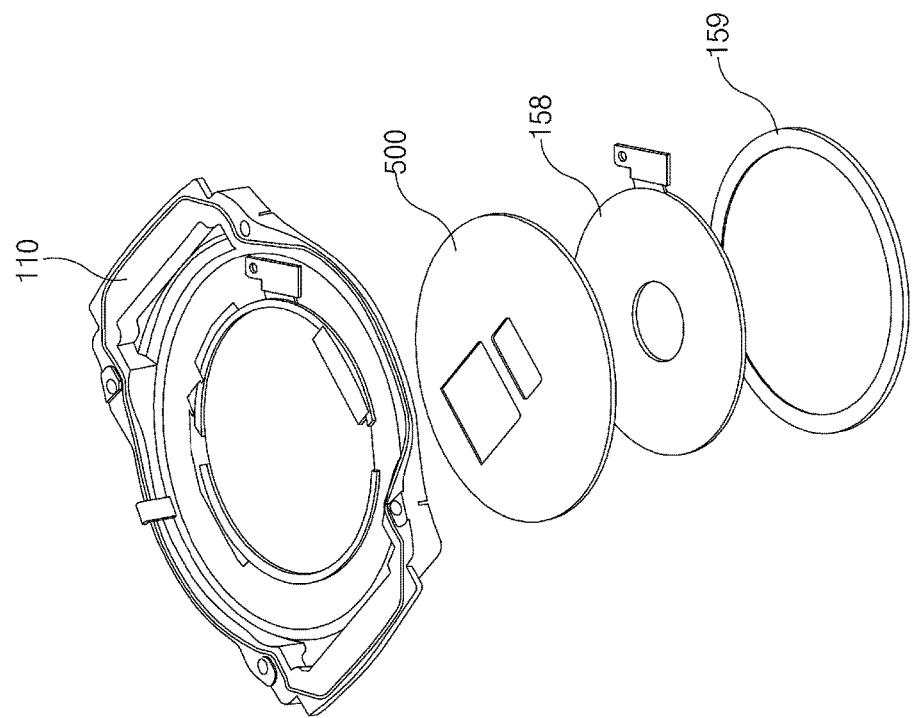
FIG. 5 is an explosive diagram illustrating a wireless charging part equipped in a cover housing of a wearable electronic device according to an embodiment of the present disclosure.
Figure 5:
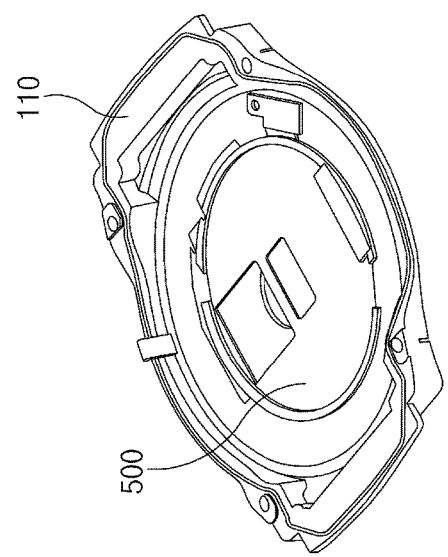

FIG. 5 is an explosive diagram illustrating a wireless charging part equipped in a cover housing of a wearable electronic device according to an embodiment of the present disclosure.

The left-most illustration of FIG. 5 is a perspective diagram of the cover housing 110 equipped with a wireless charging part 158, and the right-most illustration of FIG. 5 is an explosive perspective view of the wireless charging part 158 and the cover housing 110.

Referring to the right-most illustration of FIG. 5, the cover housing 110 may be combined with a rear deco 159. A metallic plate 500 and the wireless charging part 158 may be fixedly supported between the cover housing 110 and the rear deco 159. According to an embodiment of the present disclosure, the metallic plate 500 or the wireless charging part 158 may include a joint structure configured to at least partly join with the cover housing 110 or the rear deco 159. For example, a projection part of the wireless charging part 158 may penetrate a through hole of the metallic plate 500 and then may be stumblingly supported by a circular structure around a through hole of the cover housing 110.

The metallic plate 500 may support and protect internal elements, forming an electrical shielding structure, and may contribute to reinforcing the stiffness of the wearable electronic device 100. Especially, the metallic plate 500 may provide a magnet-attached charge settling mechanism (i.e., a mechanism by which a charger connects to the electronic device 100 via a magnet) without an additional locking structure when the metallic plate 500 is settled (i.e., resting) on a wireless charging cradle. For example, the metallic plate 500 may be attached to a magnet of the charging cradle and then may fix the wearable electronic device 100. The metallic plate 500 may be joined together with the cover housing 110 by insert-injection, assemblage, adhesion, or welding according to a material of the main structure of the metallic plate 500. According to various embodiments of the present disclosure, the cover housing 110 may further include an additional magnet therein and the wearable electronic device 100 may be attached to the charging cradle through the magnet.

The wireless charging part 159 may be formed in a circular winding coil and may be placed between the metallic plate 500 and the rear deco 159 shaping the contour. The coil may connect to a main circuit board 157 through the projection part of the wireless charging part 158. The coil may be partly open to expose diverse interface parts (e.g., a heart-rate monitor (HRM), a proximity sensor, etc.) that are equipped in the wearable electronic device 100. According to an embodiment of the present disclosure, the metallic plate 500 (or a part of the cover housing 110) and the wireless charging part 158 may include a hole to expose the diverse interface parts.

Additionally, at least a part of the rear deco 159 may include a reclosable structure for connecting a subscriber identity module (SIM) card, a memory card, and diverse external cards with diverse sockets that are equipped in the wearable electronic device 100. The upper part of the rear deco 159 may also open a part of a printed area for interface window.

Figure 6:
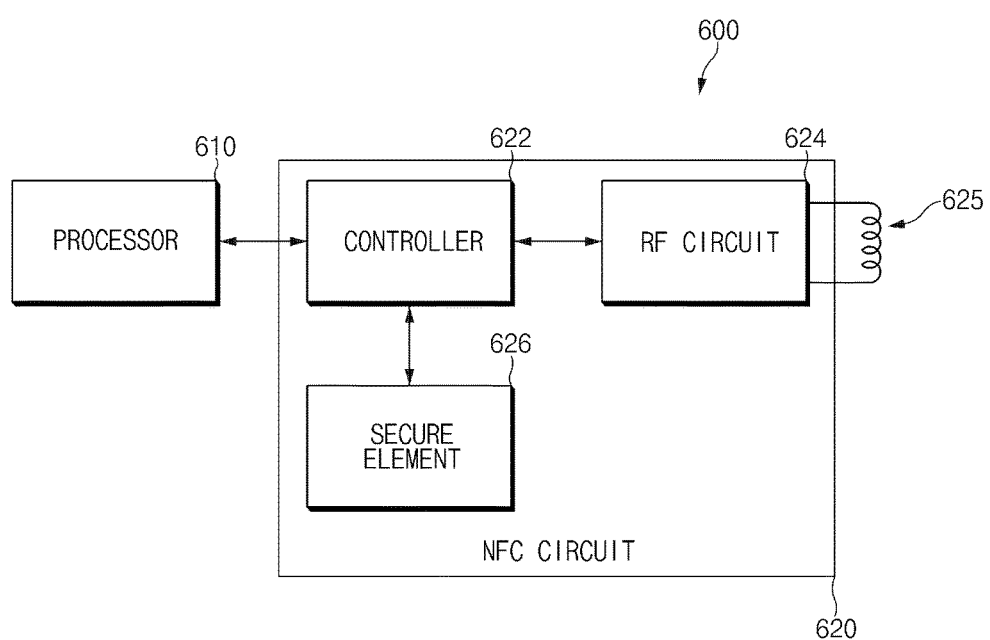
FIG. 6 is a block diagram illustrating a wearable electronic device 600 according to an embodiment of the present disclosure.

FIG. 6 is a block diagram illustrating a wearable electronic device according to an embodiment of the present disclosure.

Referring to FIG. 6, the wearable electronic device 600 includes a processor 610 and an NFC circuit 620. The NFC circuit 620 includes a controller 622, a radio frequency (RF) circuit 624, at least one antenna 625, and a secure element (SE) 626.

According to an embodiment of the present disclosure, the processor 610 may control general operations of the wearable electronic device 600. For example, in order to control an operating mode of the NFC circuit 620, the processor 610 may transfer a control signal to the NFC circuit 620. The NFC circuit 620 may operate in a card emulation mode, a reading/writing mode, and/or a peer-to-peer (P2P) mode.

The controller 622 may control the NFC circuit 620 to allow the NFC circuit to operate according to a control signal for an operating mode that is transferred from the processor 610. For example, if a signal for one communication mode of a card emulation mode, a reading/writing mode, and a P2P mode are transferred from the processor 610, the controller 622 may control the NFC circuit 610 to perform a corresponding operation.

According to an embodiment of the present disclosure, a card emulation mode may transmit information, which is stored in the secure element, to an external reader. For example, the card emulation mode may be used when performing functions for user authentication, such as payment, traffic, or identification (ID).

According to an embodiment of the present disclosure, the reading/writing mode may perform an operation for reading external tag information or writing specific information into external tag information.

According to an embodiment of the present disclosure, the P2P mode may assist data exchange between devices. The data may include, for example, name cards, call numbers, digital photographs, uniform resource locator (URL) addresses, etc.

The RF circuit 624 may demodulate a signal that is received from an external electronic device, in a specific demodulation mode and may transfer a demodulated signal to the controller 622. Additionally, the RF circuit 624 may modulate data that is transferred from the processor 610 or the secure element 626, in a specific modulation mode and may transmit a modulated signal to an external electronic device through the antenna 625.

The secure element 626 may include information for payment and/or authentication. For example, the secure element 626 may include information, which must be secured, such as a primary account number (PAN), a token, or an encryption key. The PAN may include credit card information, such as the serial number of a credit card. The PAN may be encoded information or decoded information. The token may be used as information replacing the serial number of a credit card. The encryption key may be used to generate encryption data for payment authentication.

According to an embodiment of the present disclosure, the secure element 626 may be securely accessed by the controller 622, and the processor 610 may configure the system, such that the remainder of the system does not to have authentication to directly access the secure element 626.

The antenna 625 may be formed of an antenna pattern and a matching part. The antenna 625, according to an embodiment of the present disclosure, may be a loop antenna. The matching may be implemented with respect to an inductance L and a capacitance C, and may have an impedance suitable for an operating frequency of NFC communication.

Figure 7:
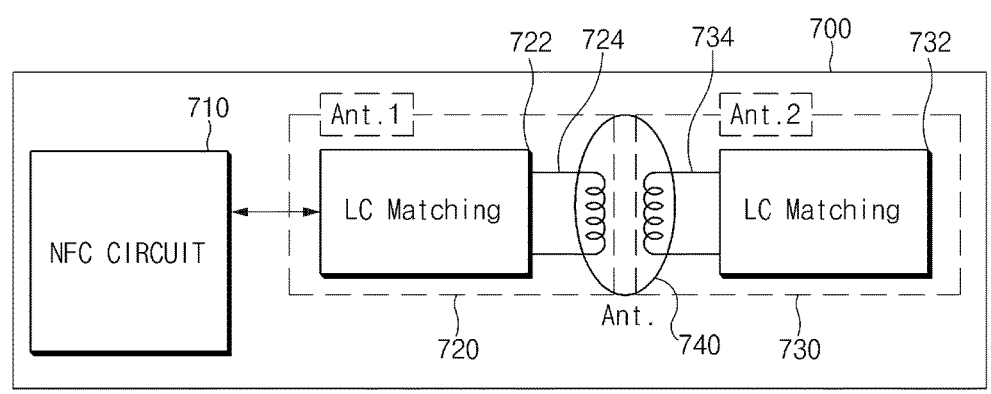
FIG. 7 is a circuit diagram illustrating a configuration for NFC through a plurality of antennas according to an embodiment of the present disclosure.

FIG. 7 is a circuit diagram illustrating a configuration for NFC through a plurality of antennas according to an embodiment of the present disclosure. Referring to FIG. 7, a wearable electronic device 700 includes an NFC circuit 710, a first antenna 720, and a second antenna 730.

According to an embodiment of the present disclosure, the first antenna 720 includes a first inductance/capacitance (LC) marching part 722 and a first antenna pattern 724, and the second antenna 730 may include a second LC matching part 732 and a second antenna pattern 734.

Referring to reference numeral 740 in FIG. 7, when providing a signal to the first antenna 720, a magnetic field may be generated in the first antenna pattern 722 and may be coupled with the second antenna pattern 732 which is adjacent to the first antenna pattern 722. Through this mechanism, the second antenna 730 may be coupled with a magnetic field corresponding to a signal that is provided to the first antenna 720.

The example illustrated in FIG. 7 includes two antennas, whereas, hereinafter examples described with reference FIGS. 8A and 8B include three antennas.

Figure 8A:
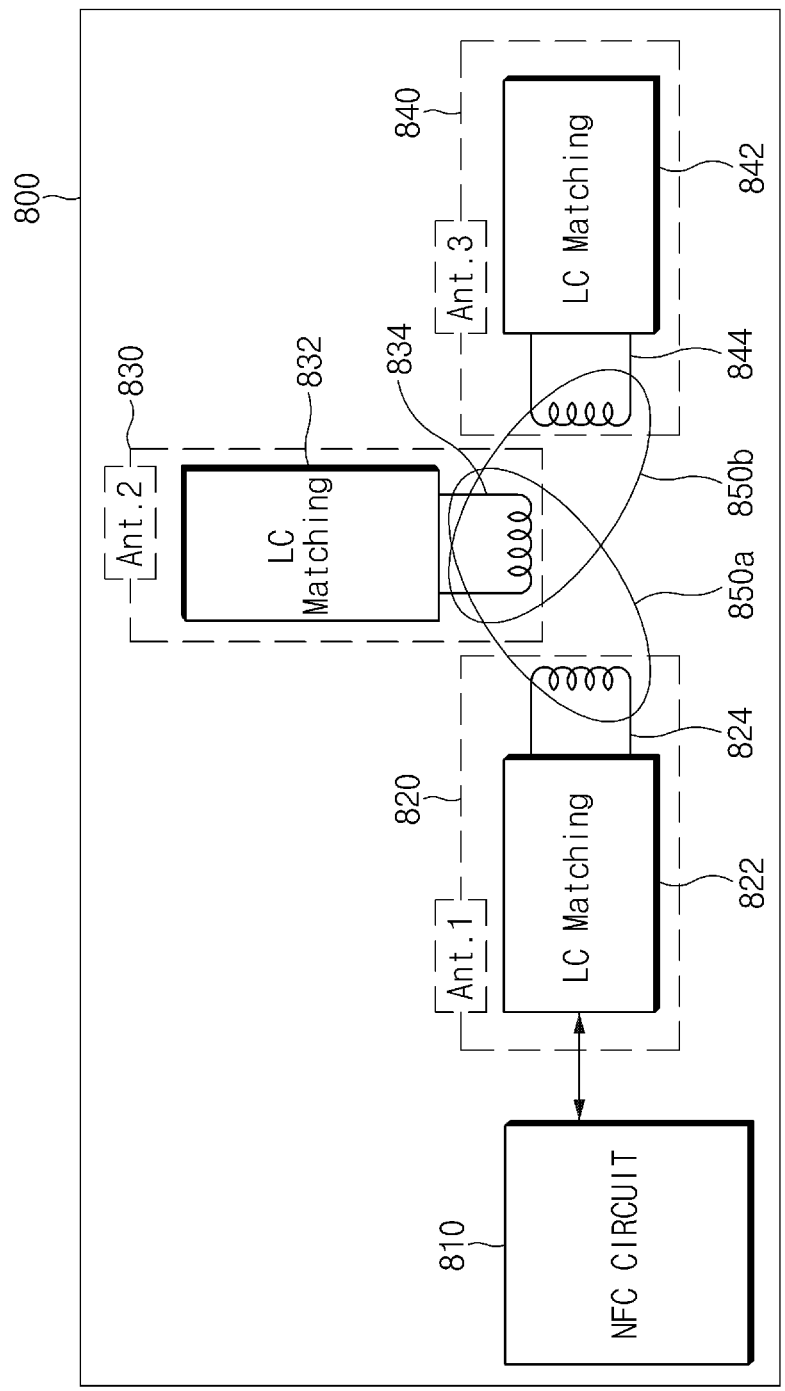
FIG. 8A is a circuit diagram illustrating a configuration for NFC through a plurality of antennas according to an embodiment of the present disclosure.

FIG. 8A is a circuit diagram illustrating a configuration for NFC through a plurality of antennas according to an embodiment of the present disclosure.

Referring to FIG. 8A, a wearable electronic device 800 includes an NFC circuit 810, a first antenna 820, a second antenna 830, and a third antenna 840.

According to an embodiment of the present disclosure, the first antenna 820 includes a first LC matching part 822 and a first antenna pattern 824, the second antenna 830 may include a second LC matching part 832 and a second antenna pattern 834, and the third antenna 840 may include a third LC matching part 842 and a fourth antenna pattern 844.

Referring to reference numeral 850a in FIG. 8A, based on a signal provided to the first antenna 820, a magnetic field may be generated in the first antenna pattern 822 and may be coupled with the second antenna pattern 832, which is adjacent to the first antenna pattern 822. Through this mechanism, the second antenna 830 may be coupled with a magnetic field corresponding to a signal which is provided to the first antenna 820. Additionally, referring to reference numeral 850b in FIG. 8A, a magnetic field based on the first antenna 820 may be generated in the second antenna pattern 830 and then may be coupled with the third antenna pattern 840, which is adjacent to the second antenna pattern 832. As a result, the second antenna 830 and the third antenna 840 may be coupled with a magnetic field corresponding to a signal that is provided to the first antenna 820.

Figure 8B:
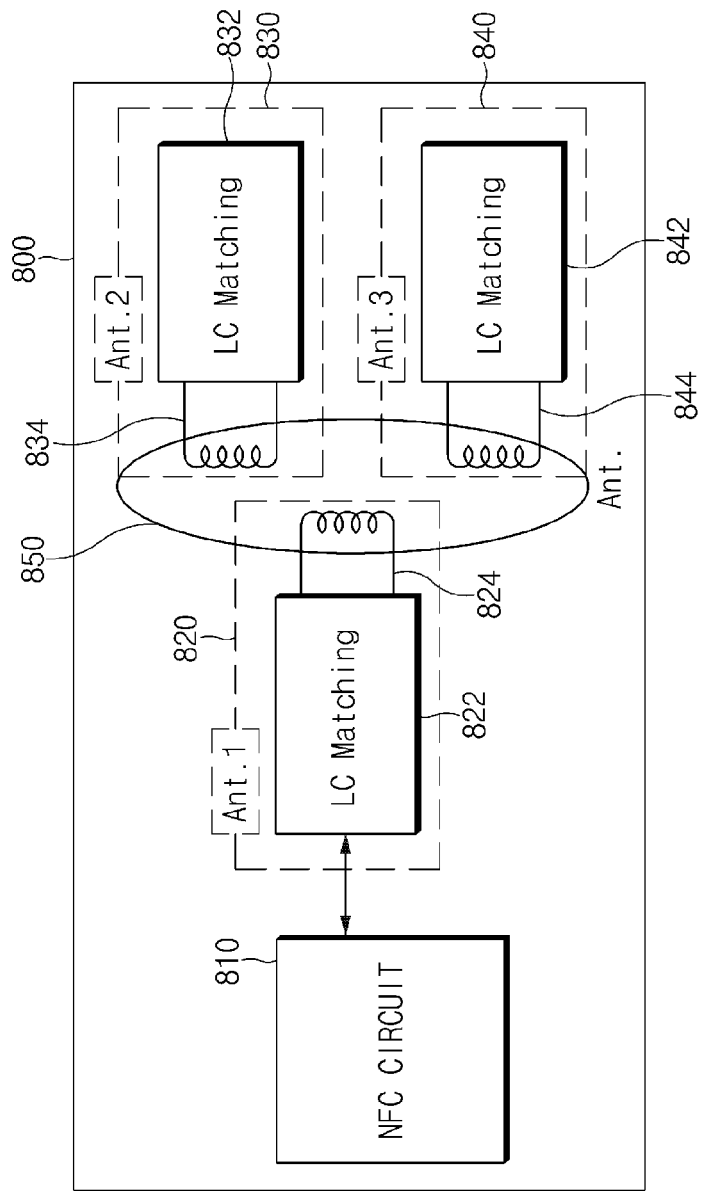
FIG. 8B is a circuit diagram illustrating a configuration for NFC through a plurality of antennas according to an embodiment of the present disclosure.

FIG. 8B is a circuit diagram illustrating a configuration for NFC through a plurality of antennas according to an embodiment of the present disclosure.

Referring to FIG. 8B, a wearable electronic device 800 includes an NFC circuit 810, a first antenna 820, a second antenna 830, and a third antenna 840.

According to an embodiment of the present disclosure, a first antenna 820 includes a first LC matching part 822, a first antenna pattern 824, a second antenna 830 includes a second LC matching part 832 and a second antenna pattern 834, and the third antenna 840 includes a third LC matching part 842 and a fourth antenna pattern 844.

Referring to reference numeral 850 of FIG. 8B, based on a signal provided to the first antenna 820, a magnetic field may be generated in the first antenna pattern 822 and then may be coincidently coupled with the second antenna pattern 832 and the third antenna pattern 842. Through this mechanism, the second antenna 830 and the third antenna 840 are coupled with a magnetic field corresponding to a signal that is provided to the first antenna 820.

Figure 9A:
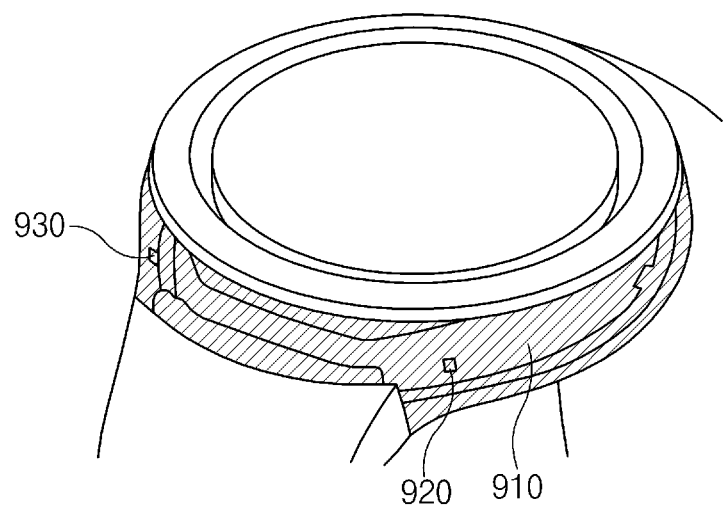
FIG. 9A is a diagram illustrating a wearable electronic device according to an embodiment of the present disclosure.

FIG. 9A is a diagram illustrating a wearable electronic device according to an embodiment of the present disclosure.

Referring to FIG. 9A, a wearable electronic device 900 includes a body case 910, a first contact element 920, and a second contact element 930. The body case 910 may connect to a main circuit board (not shown) through the first contact element 920 and the second contact element 930. Hereinafter, structural features of the wearable electronic device 900 are described with reference to FIGS. 9B and 9C.

Figure 9B:
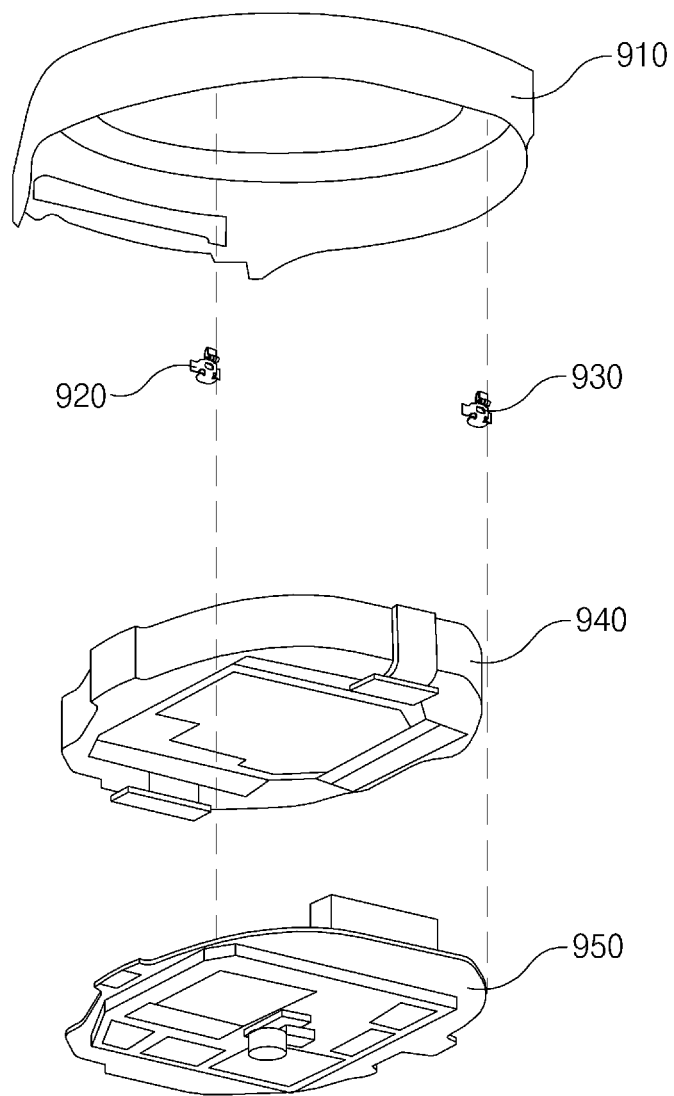
FIG. 9B is an explosive perspective diagram illustrating a wearable electronic device according to an embodiment of the present disclosure.
Figure 9C:
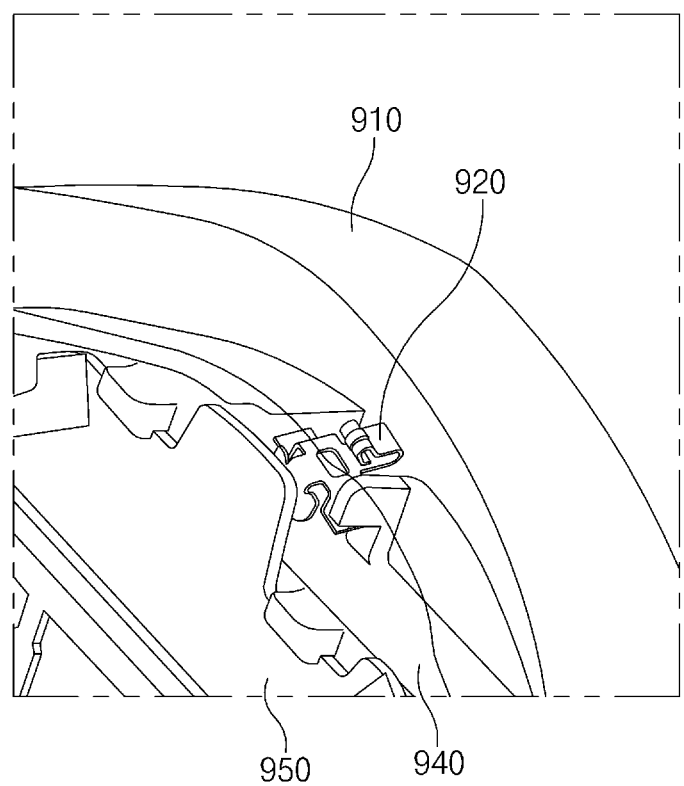
FIG. 9C is a partially enlarged diagram illustrating a contact element of a wearable electronic device according to an embodiment of the present disclosure.

FIG. 9B is an explosive perspective diagram illustrating a wearable electronic device according to an embodiment of the present disclosure, and FIG. 9C is a partially enlarged diagram illustrating a contact element of a wearable electronic device according to an embodiment of the present disclosure.

Referring to FIGS. 9B and 9C, a body case 910 may be connected with a main circuit board 950 through a first contact element 920 and a second contact element 930. In this configuration, an inner bracket 940 may act to secure the main circuit board 950 and may form a settling part for the first contact element 920 and the second contact element 930.

According to an embodiment of the present disclosure, the first contact element 920 and the second contact element 930 may directly connect with the main circuit board 950. Alternatively, the first contact element 920 and the second contact element 930 may be indirectly connected with the main circuit board 950 through an additional element that extends from the main circuit board 950.

The body case 910 may act as an antenna. According to an embodiment of the present disclosure, the body case 910 may be made entirely of a metallic material. Alternatively, the body case 910 may be made of a nonconductive material including a metallic part that is partly disposed in a manner suitable for functioning as a loop antenna. Additionally, the first contact element 920 and the second contact element 930 may be made of a metallic material. The first contact element 920 or the second contact element 930 may connect to an LC matching part that is formed on the main circuit board 950. Through this configuration, the body case 910 may connect to the LC matching part to act as an NFC loop antenna.

A signal induced from the LC matching part into the first contact element 920 or the second contact element 930 may be applied to the second contact element 930 or the first contact element 920 through the body case 910. In this case, the signal may be transferred through two paths on the body case 910. For example, when, in the example of FIG. 9A, a signal is induced into the second contact element 930 through the body case 910 from the first contact element 920, the signal may be transferred through a first path that is short and has a clockwise direction, or through a second path that is long and has an anticlockwise direction. According to an embodiment of the present disclosure, the signal may be transferred through a shorter path that has relatively low resistance.

Figure 10A:
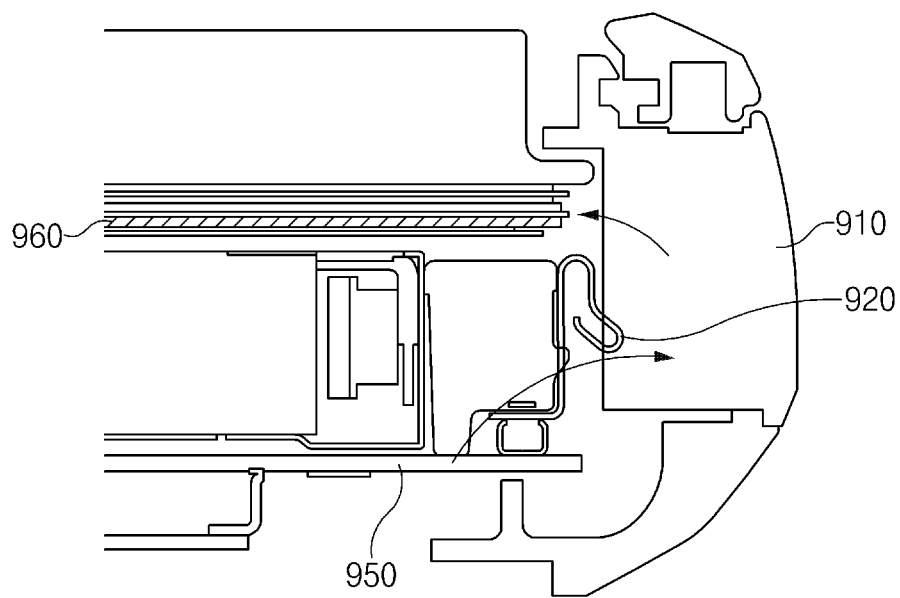
FIG. 10A is a diagram illustrating a communicating method employing two antennas in a wearable electronic device according an embodiment of the present disclosure.
Figure 10B:
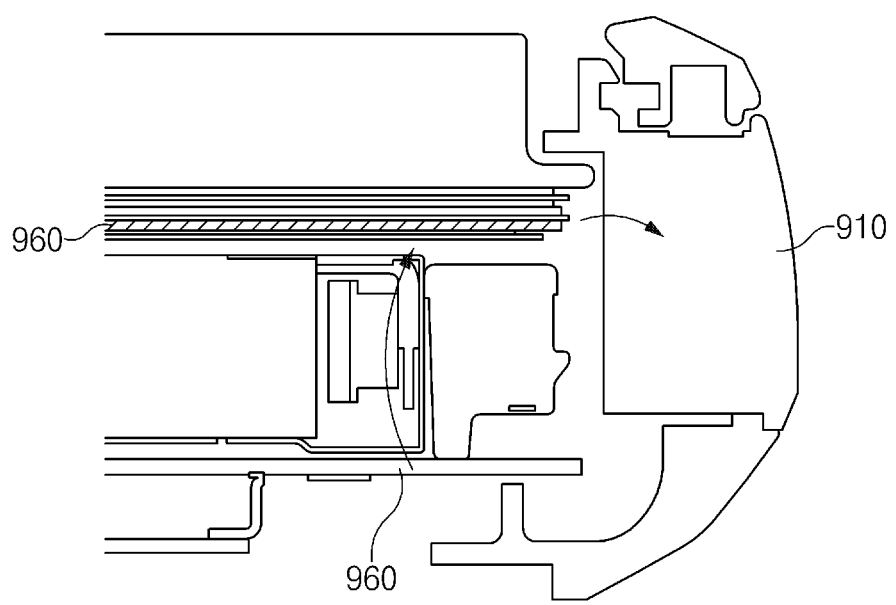
FIG. 10B is a diagram illustrating a communicating method employing two antennas in a wearable electronic device according an embodiment of the present disclosure.

FIGS. 10A and 10B are diagrams illustrating a communicating method employing two antennas in a wearable electronic device according an embodiment of the present disclosure.

Referring to FIG. 10A, a body case 910 may connect to a main circuit board 950 through a contact element 920. Additionally, the rear side of the display may provide a loop antenna 960.

Referring to FIG. 10B, according to another embodiment of the present disclosure, although the body case 910 is indirectly connected with the main circuit board 950, it may be possible to easily perform communication through the wearable electronic device. Accordingly, in contrast to the example of FIG. 10A, the contact element 920 is not additionally included in the wearable electronic device of FIG. 10B.

Referring to a signal flow shown in FIG. 10A, a signal may be primarily excited to the body case 910 through the contact element 920 from the main circuit board 950, and then may be secondarily induced into the loop antenna 960 through a magnetic field from the body case 910.

Referring to a signal flow shown in FIG. 10B, the signal may be primarily excited to the loop antenna 960 from the main circuit board 950, and then may be secondarily induced into the body case 910 through a magnetic field from the loop antenna 960. For excitation of the signal to the loop antenna 960 from the main signal board 950, the main circuit board 950 and the loop antenna 960 may be partly connected each other through a conductive material.

Figure 10C:
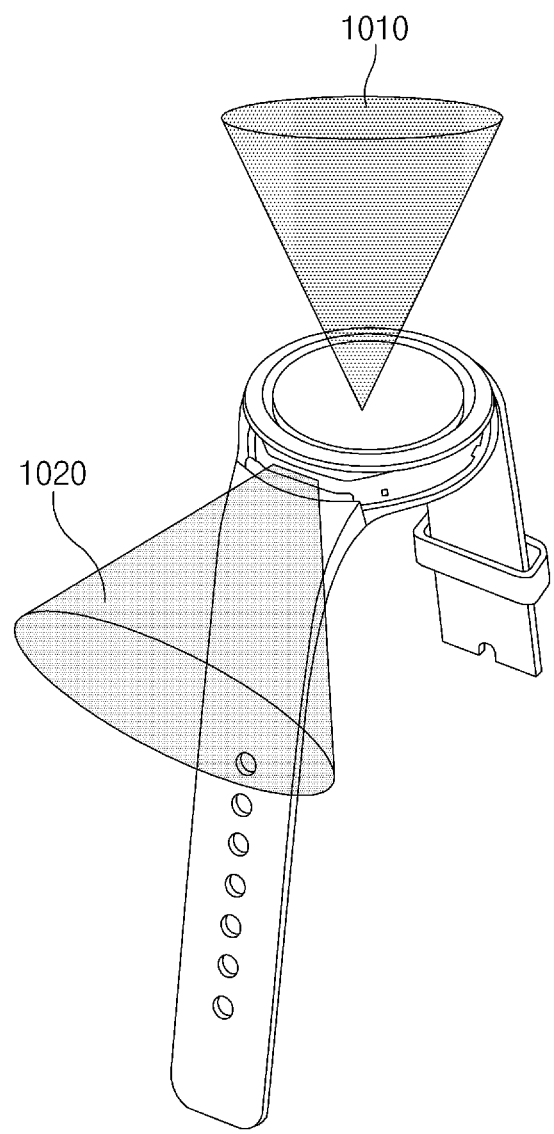
FIG. 10C is a diagram illustrating directions of communication performed in the wearable electronic device of FIGS. 10A and 10B according to an embodiment of the present disclosure.

FIG. 10C is a diagram illustrating directions of communication performed in the wearable electronic device of FIGS. 10A and 10B according to an embodiment of the present disclosure. Referring to FIGS. 10A and 10B, the body case 910 and the loop antenna 960 operate as a radiator. NFC directions of the wearable electronic device (i.e., directions of NFC communications with respect to the wearable device) include a first direction 1010 (i.e., extending in a frontward direction from the display) by the loop antenna 960 and a second direction 1020 extending from an area (i.e., extending in a direction a short path between the contact elements) of the body case 910.

When employing two or more antennas as illustrated in FIG. 10C, a user is able to more conveniently touch the wearable electronic device to a reader while wearing the wearable electronic device. If only the first direction 1010 is available to use NFC, it may be inconvenient for a user to twist his wrist, on which a wearable electronic device is worn, outward from his body to an orientation in which a display of the wearable electronic device is parallel with a reader. By contrast, since a wearable electronic device according to the present disclosure may additionally perform NFC in the second direction 1020, which radiates from the body case 910, a user is able to easily perform NFC, even while display of the wearable electronic device is not oriented parallel with a reader.

Figure 11A:
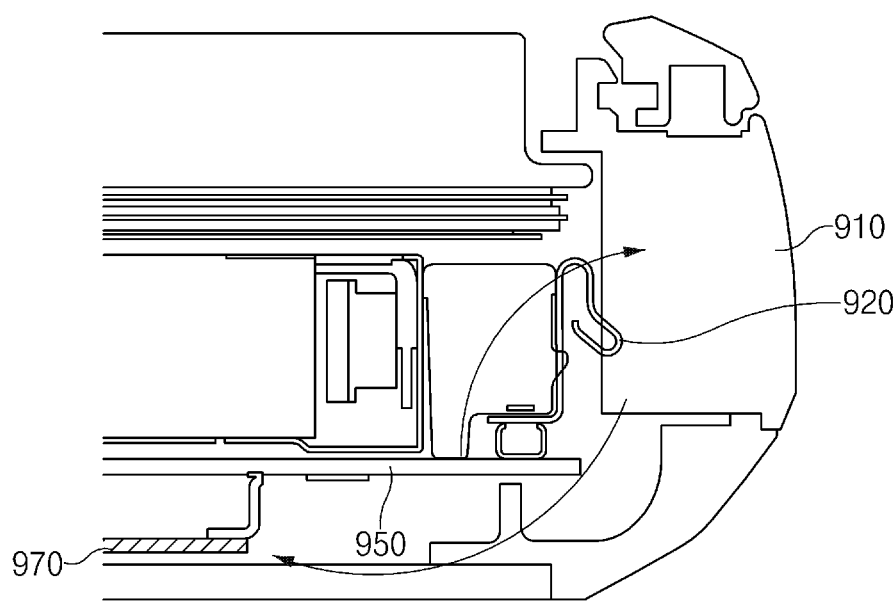
FIG. 11A is a diagram illustrating a communicating method employing two antennas in a wearable electronic device according an embodiment of the present disclosure.
Figure 11B:
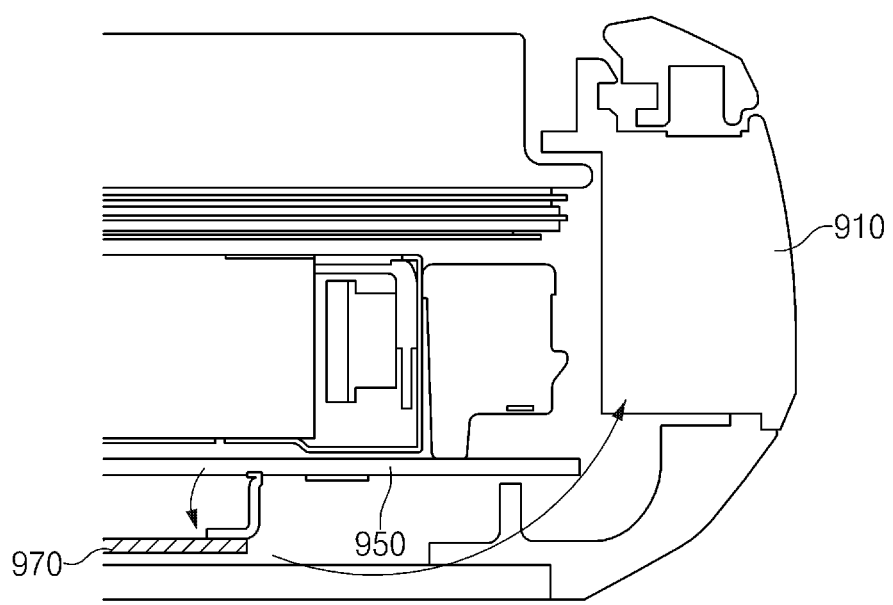
FIG. 11B is a diagram illustrating a communicating method employing two antennas in a wearable electronic device according an embodiment of the present disclosure.

FIGS. 11A and 11B are diagrams illustrating a communicating method employing two antennas in a wearable electronic device according an embodiment of the present disclosure.

Referring to FIG. 11A, a body case 910 may connect to a main circuit board 950 through a contact element 920. Additionally, the wearable electronic device includes a loop antenna 970 that may be positioned adjacent to the inner surface of the wearable electronic device or at the rear surface of a rear deco 159.

Referring to FIG. 11B, according to another embodiment of the present disclosure, it may be possible to easily perform communication through the wearable electronic device, even though the body case 910 is indirectly connected with the main circuit board 950. Accordingly, in contrast to the example of FIG. 11A, the wearable electronic device of FIG. 11B does not additionally include the contact element 920.

Referring to a signal flow shown in FIG. 11A, a signal may be primarily excited to the body case 910 through the contact element 920 from the main circuit board 950, and then may be secondarily induced into the loop antenna 960 through a magnetic field from the body case 910.

Referring to a signal flow shown in FIG. 11B, a signal may be primarily excited to the loop antenna 970 from the main circuit board 950, and then may be secondarily induced into the body case 910 through a magnetic field from the loop antenna 970. Although not illustrated in FIG. 11B, for excitation of the signal to the loop antenna 970 from the main signal board 950, the main circuit board 950 and the loop antenna 970 may be partially connected each other through a conductive material.

Figure 11C:
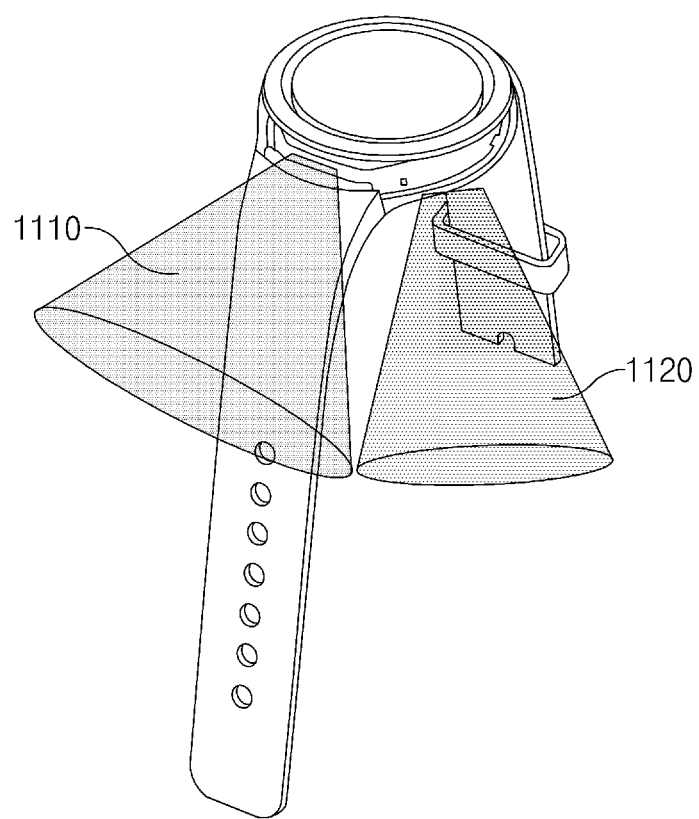
FIG. 11C is a diagram illustrating directions of communication performed in the wearable electronic device of FIGS. 11A and 11B according to an embodiment of the present disclosure.

FIG. 11C is a diagram illustrating directions of communication performed in the wearable electronic device of FIGS. 11A and 11B according to an embodiment of the present disclosure. Referring to FIGS. 11A and 11B, the body case 910 and the loop antenna 970 operate as a radiator. NFC directions of the wearable electronic device may include a first direction 1110 extending from an area (i.e., a short path between the contact elements) of the body case 910, and a second direction 1120 (i.e., extending in a rearward direction from the rear deco 159) by the loop antenna 970.

Figure 12:
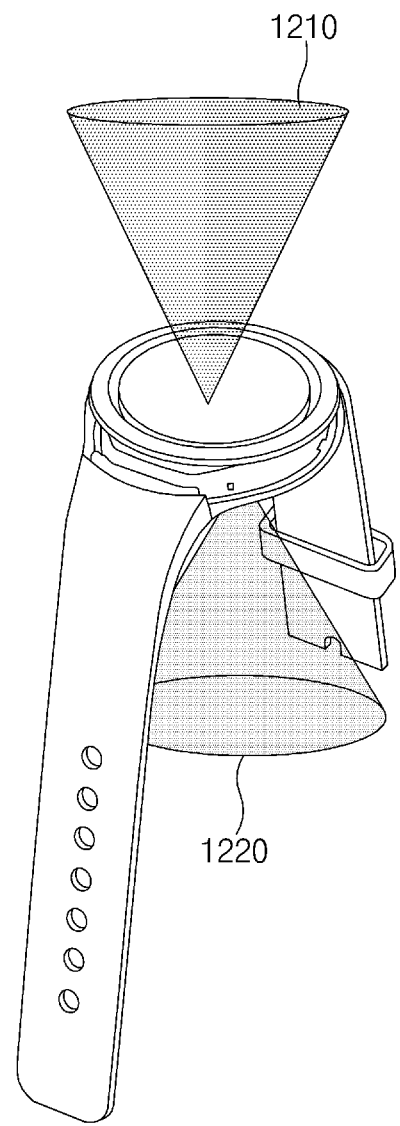
FIG. 12 is a diagram illustrating directions of communication performed in a wearable electronic device according to an embodiment of the present disclosure.

FIG. 12 is a diagram illustrating directions of communication performed in a wearable electronic device according to an embodiment of the present disclosure. When the wearable electronic device does not employ a body case 910, but the loop antenna 960 of FIG. 10A and the loop antenna 970 of FIG. 11A as an antenna structure, NFC directions of the wearable electronic device may include a first direction 1210 (i.e., extending in a frontward direction from the display) by the loop antenna 960, and a second direction 1220 (extending in a rearward direction from a rear deco) by an area of the loop antenna 970.

The wearable electronic devices illustrated in FIGS. 9 to 12 employ two antennas, whereas a wearable electronic device according to an embodiment of the present disclosure may employ three antennas as illustrated hereinbelow in FIGS. 13 and 14.

Figure 13A:
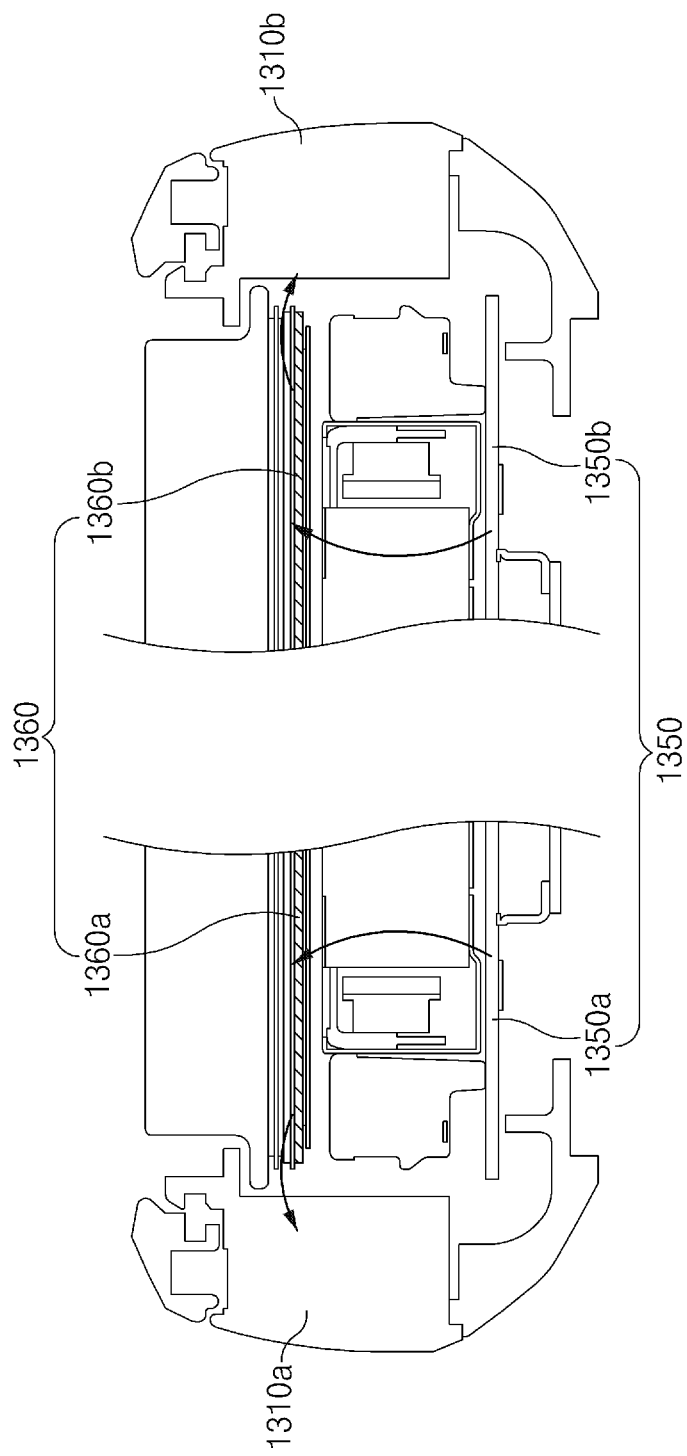
FIG. 13A is a diagram illustrating a communicating method employing three antennas in a wearable electronic device according an embodiment of the present disclosure.

FIG. 13A is a diagram illustrating a communicating method employing three antennas in a wearable electronic device according an embodiment of the present disclosure.

Referring to FIG. 13A, a rear surface of a display provides a first loop antenna 1360*a* and a second loop antenna 1360*b*.

Although FIG. 13A is divisionally shown with a left-side configuration and a right-side configuration, the left and right-side configurations may be integrated in one body forming the wearable electronic device. For example, body cases 1310*a* and 1310*b* may be integrated in one body and may include a metallic material. Additionally, main circuit boards 1350*a* and 1350*b* may be a unitary circuit board of a main circuit board 1350, and loop antennas 1360*a* and 1360*b* may be also a unitary loop antenna of a loop antenna 1360.

Referring to a feature of signal flow shown in FIG. 13A, the signal may be primarily excited to the first loop antenna 1360*a* from the first main circuit board 1350*a* and then may be excited to the second loop antenna 1360*b* from the second main circuit board 1350*b*. Additionally, the signal may be secondarily induced from the first loop antenna 1360*a* to the first body case 1310*a* and then may be induced from the second loop antenna 1360*b* to the second body case 1310*b* through a magnetic field.

In the example of FIG. 13A, a signal excited to the first loop antenna 1360*a* from the first main circuit board 1350*a* is different from a signal excited to the second loop antenna 1360*b* from the second main circuit board 1350*b*. However, as described above, since the first and second loop antennas 1360*a* and 1360*b* may be integrated in a unitary body, the signals excited from the main circuit board 130 to the loop antenna 1360 may be the same signal.

Figure 13B:
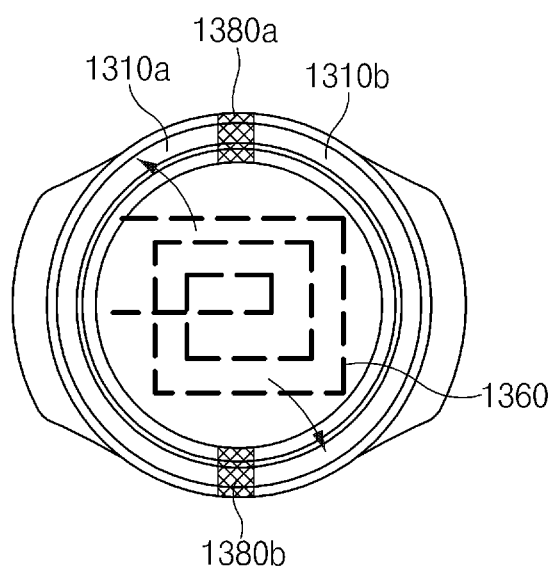
FIG. 13B is a diagram illustrating a top view of the wearable electronic device of FIG. 13A according to an embodiment of the present disclosure.

FIG. 13B is a diagram illustrating a top view of the wearable electronic device of FIG. 13A according to an embodiment of the present disclosure.

Referring to FIG. 13B, the first and second body cases 1310*a* and 1310*b* are integrated into a single body case. First and second insulators 1380*a* and 1380*b* may be disposed between the body cases 1310*a* and 1310*b*. As the body case is equipped with the first and second insulators 1380*a* and 1380*b*, NFC may be available through the first and second body cases 1310*a* and 1310*b*, which are divided by the first and second insulators 1380*a* and 1380*b*.

An antenna pattern of the loop antenna 1360 illustrated in FIG. 13B is merely one of various antenna loop patterns according to embodiments of the present disclosure, and embodiments of the present disclosure are not limited to the loop pattern of the loop antenna 1360.

Figure 13C:
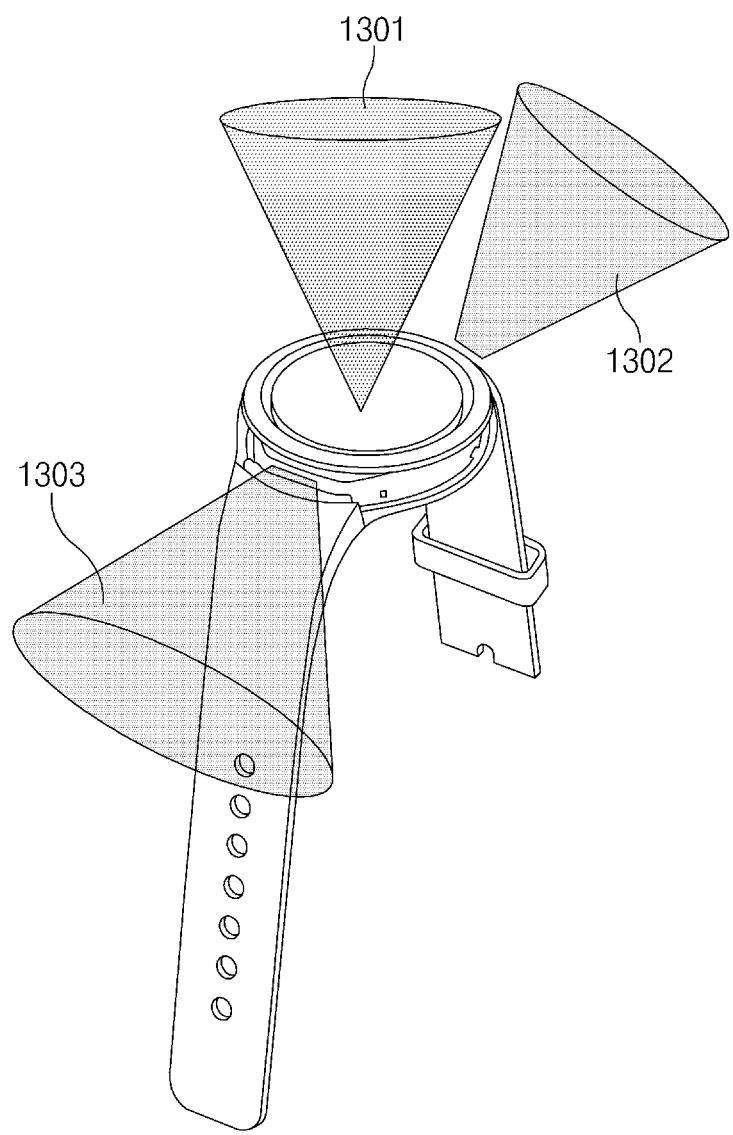
FIG. 13C is a diagram illustrating directions of communication performed in the wearable electronic device of FIGS. 13A and 13B according to an embodiment of the present disclosure.

FIG. 13C is a diagram illustrating directions of communication performed in the wearable electronic device of FIGS. 13A and 13B according to an embodiment of the present disclosure. Referring to FIGS. 13A and 13B, the first and second body cases 1310*a* and 1310*b*, and the loop antenna 1360 operate as a radiator. NFC directions of the wearable electronic device include a first direction 1301 (i.e., a direction extending in a frontward direction from the display) by the loop antenna 1360, a second direction 1302 extending from an area of the first body case 1310*a*, and a third direction 1303 extending from an area of the second body case 1310*b*.

Figure 14A:
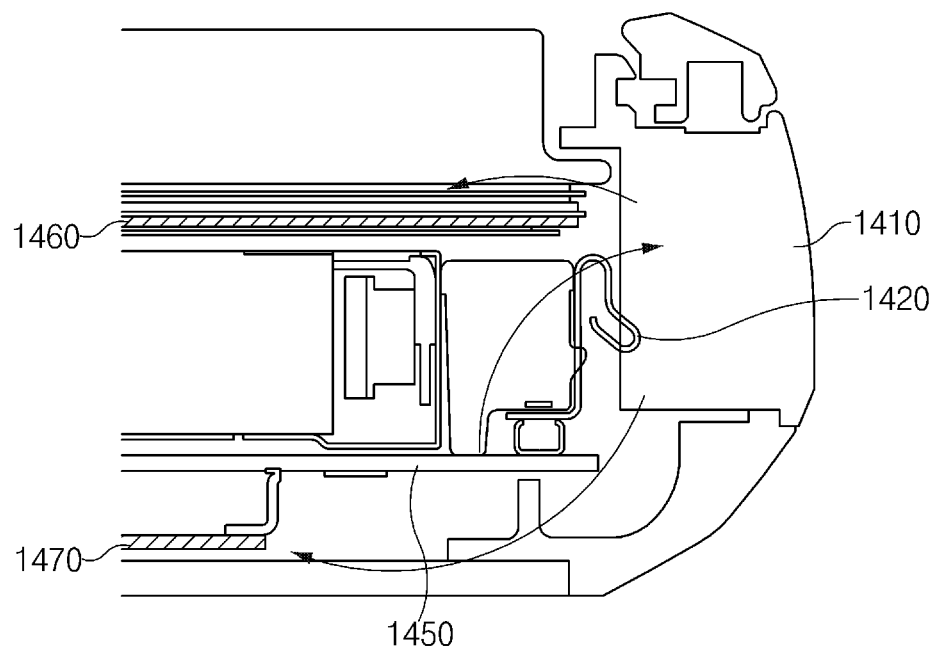
FIG. 14A is a diagram illustrating a communicating method employing three antennas in a wearable electronic device according an embodiment of the present disclosure.

FIG. 14A is a diagram illustrating a communicating method employing three antennas in a wearable electronic device according an embodiment of the present disclosure. Referring to FIG. 14A, a body case 1410 may connect to a main circuit board 1450 through a contact element 1420. Additionally, a rear surface of a display may provide a first loop antenna 1460 and a rear surface of a rear deco may provide a second loop antenna 1470.

Referring to a feature of signal flow shown in FIG. 14A, the signal may be primarily excited to the body case 1410 from the main circuit board 1450 through the contact element 1420 and then may be secondarily excited to the first loop antenna 1460 and the second loop antenna 1470 from the main circuit board 1410 through a magnetic field.

According to an embodiment of the present disclosure, the signal may be induced to the first loop antenna 1460 and the second loop antenna 1470 at the same time from the body case 1410 through a magnetic field after excitation to the body case 1410.

Additionally, according to an embodiment of the present disclosure, the signal may be primarily excited to the body case 1410 through the contact element 1420 from the main circuit board 1450, then may be secondarily induced to the first loop antenna 1460 from the body case 1410 through a magnetic field, and may be thirdly induced even to the second loop antenna 1470 from the first loop antenna 1460 through the magnetic field. Otherwise, the sequence of signal transfer may vary, such that the signal may be primarily excited to the body case 1410 through the contact element 1420 from the main circuit board 1450, then may be secondarily induced to the second loop antenna 1470 from the body case 1410 through a magnetic field, and may be thirdly induced even to the first loop antenna 1460 from the second loop antenna 1470 through the magnetic field.

Figure 14B:
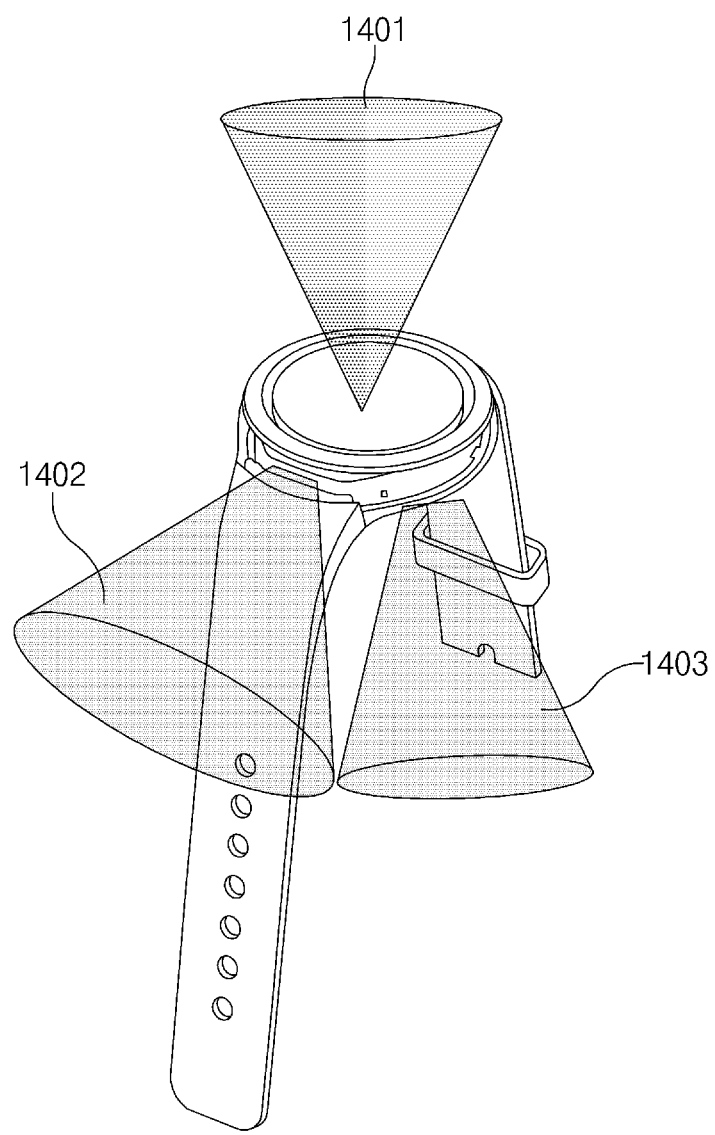
FIG. 14B is a diagram illustrating directions of communication performed in the wearable electronic device of FIG. 14A according to an embodiment of the present disclosure.

FIG. 14B is a diagram illustrating directions of communication performed in the wearable electronic device of FIG. 14A according to an embodiment of the present disclosure. Referring to FIG. 14A, the body case 1410, the first loop antenna 1460, and the second loop antenna 1470 operate as a radiator. NFC directions of the wearable electronic device in FIG. 14B may include a first direction 1401 (i.e., extending in a frontward direction from the display) by the first loop antenna 1460, a second direction 1402 extending from an area (i.e., in a direction of a short path between the contact elements) of the body case 1410, and a third direction 1403 (i.e., extending in a rearward direction from the rear deco) from an area of the second loop antenna 1470.

According to an embodiment of the present disclosure, a wearable electronic device may employ loop antennas, which are divided in two parts from a loop antenna placed on a rear surface of a display, and a body case for an NFC antenna. Alternatively, a wearable electronic device may employ loop antennas, which are divided in two parts from a loop antenna placed on a rear surface of a rear deco, and a body case for an NFC antenna. Other features according to an embodiment of the present disclosure are described in with reference to FIGS. 15A to 16B.

Figure 15A:
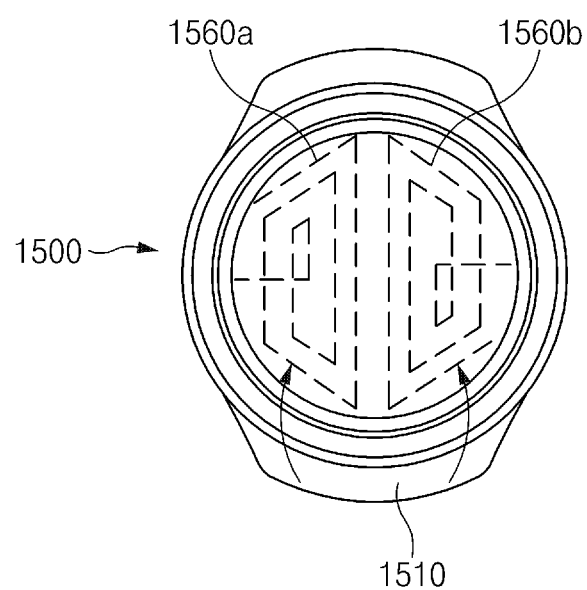
FIG. 15A is a diagram illustrating a communicating method employing three antennas in a wearable electronic device according an embodiment of the present disclosure.

FIG. 15A is a diagram illustrating a communicating method employing three antennas in a wearable electronic device according an embodiment of the present disclosure.

FIG. 15A depicts a top view of a wearable electronic device 1500.

A body case 1510 may receive a communication signal from a main circuit board. The signal may cause a magnetic field at the body case 1510 and the magnetic field may induce a second magnetic field at a first loop antenna 1560*a* and a second loop antenna 1560*b*, which are adjacent to the body case 1510, at the same time. The first loop antenna 1560*a* and the second loop antenna 1560*b* may be placed at a rear surface of a display. The first loop antenna 1560*a* and the second loop antenna 1560*b* are depicted by dotted lines in FIG. 15A, because the first loop antenna 1560*a* and the second loop antenna 1560*b* are not visible through the exterior of the wearable electronic device 1500.

Figure 15B:
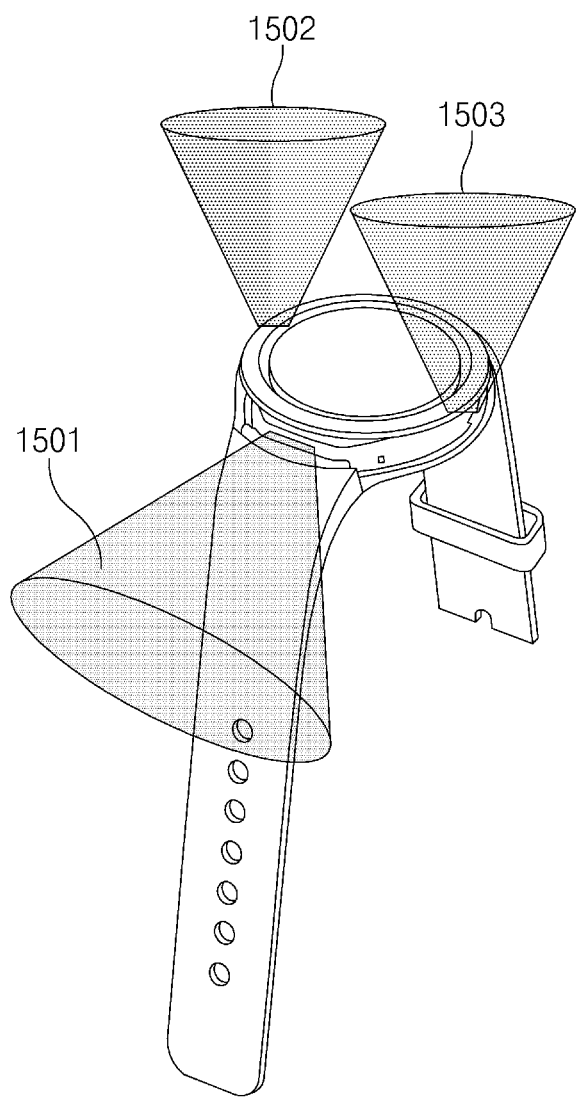
FIG. 15B is a diagram illustrating directions of communication performed in the wearable electronic device of FIG. 15A according to an embodiment of the present disclosure.

FIG. 15B is a diagram illustrating directions of communication performed in the wearable electronic device of FIG. 15A according to an embodiment of the present disclosure.

Referring to FIG. 15A, the body case 1510, the first loop antenna 1560*a*, and the second loop antenna 1560*b* operate as a radiator. NFC directions of the wearable electronic device in FIG. 15B may include a first direction 1501 (i.e. extending in a frontward direction from the display) through an area (i.e., a direction extending through a short path between contact elements) of the body case 1510, a second direction 1502 (i.e. extending in a the frontward direction from the display and a direction toward a portion of the circumference of the display) from the first loop antenna 1560*a*, and a third direction 1503 (i.e., extending in a frontward direction from the display and a from a portion of the circumference of the display) from an area of the second loop antenna 1560*b*.

Figure 16A:
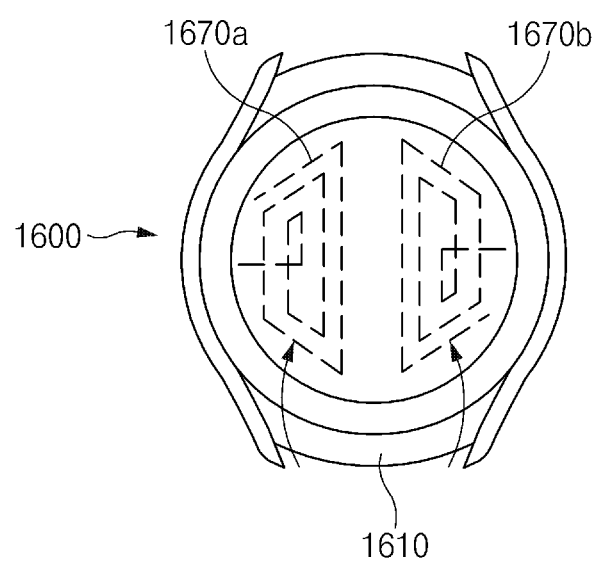
FIG. 16A is a diagram illustrating a communicating method employing three antennas in a wearable electronic device according an embodiment of the present disclosure.

FIG. 16A is a diagram illustrating a communicating method employing three antennas in a wearable electronic device according an embodiment of the present disclosure.

FIG. 16A is a top view of a wearable electronic device 1600 at the rear.

A body case 1610 may receive a communication signal from a main circuit board. The signal may cause a magnetic field at the body case 1610 and the magnetic field may simultaneously induce a second magnetic field at a first loop antenna 1670*a* and a second loop antenna 1670*b*, which are adjacent to the body case 1610. The first loop antenna 1670*a* and the second loop antenna 1670*b* may be placed adjacent to a rear surface of a rear deco. The first loop antenna 1670*a* and the second loop antenna 1670*b* are depicted by dotted lines in FIG. 16A, because the first loop antenna 1670*a* and the second loop antenna 1670*b* cannot be seen from the exterior of the wearable electronic device 1600.

Figure 16B:
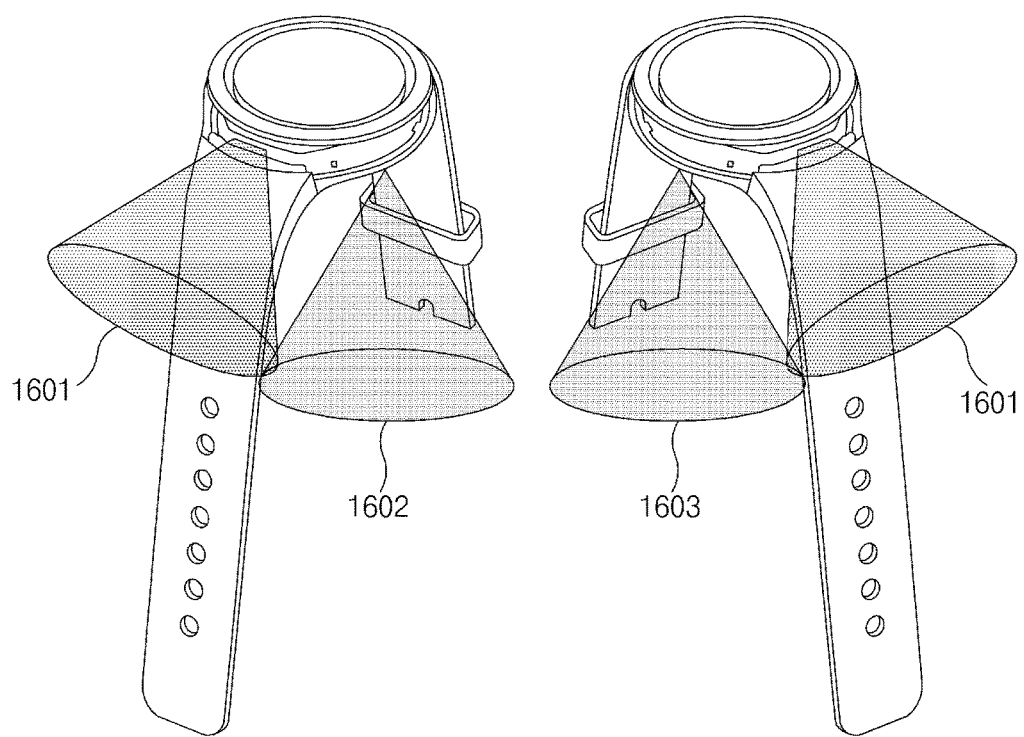
FIG. 16B is a diagram illustrating directions of communication performed in the wearable electronic device of FIG. 16A according to an embodiment of the present disclosure.

FIG. 16B is a diagram illustrating directions of communication performed in the wearable electronic device of FIG. 16A according to an embodiment of the present disclosure.

Referring to FIGS. 16A and 16B, the body case 1610, the first loop antenna 1670a, and the second loop antenna 1670b operate as a radiator. NFC directions of the wearable electronic device in FIG. 16B include a first direction 1601 extending from an area (i.e., a direction extending from a short path between contact elements) of the body case 1610, a second direction 1602 (i.e., a rearward direction extending from the rear deco and extending from a portion of a circumference of the display) from the first loop antenna 1670a, and a third direction 1603 (i.e., a direction extending in a rearward direction from the rear deco and extending from a portion of a circumference of the display) from an area of the second loop antenna 1670b.

Figure 17:
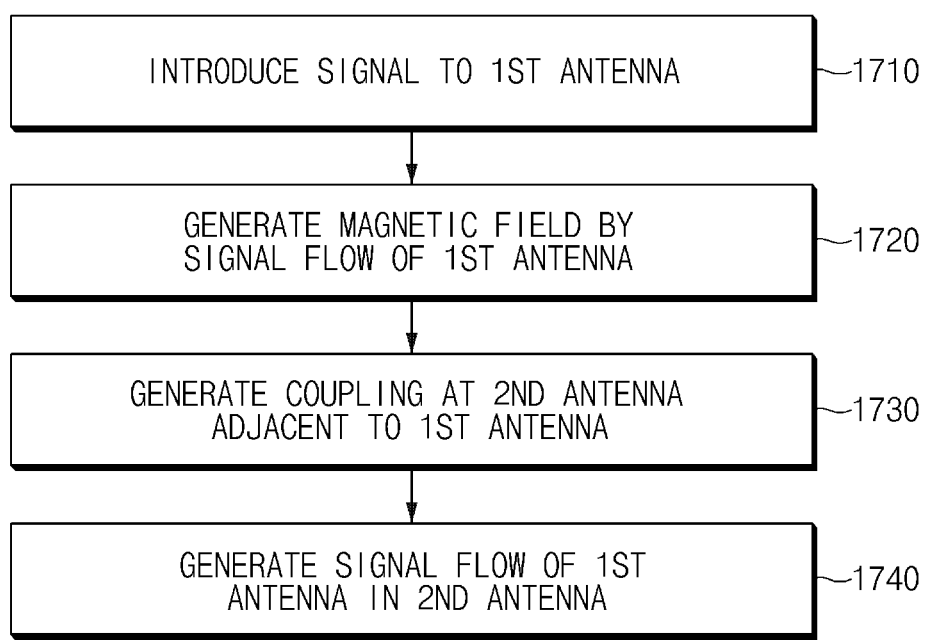
FIG. 17 is a flow chart illustrating a method of inducing a signal to one of two adjacent antennas, using a signal which is introduced into the other antenna, according to an embodiment of the present disclosure.

FIG. 17 is a flow chart illustrating a method of inducing a signal to one of two adjacent antennas, using a signal that is introduced into the other antenna, according to an embodiment of the present disclosure.

At operation 1710, a signal is introduced into a first antenna from an RF circuit from an LC matching part.

At operation 1720, a magnetic field is generated at the first antenna according to a flow of the signal introduced in operation 1710.

At operation 1730, a coupling is generated at a second antenna adjacent to the first antenna in correspondence with the magnetic field generated in operation 1720.

At operation 1740, a signal flow is generated in the second antenna by the coupling generated during operation 1730.

Figure 18:
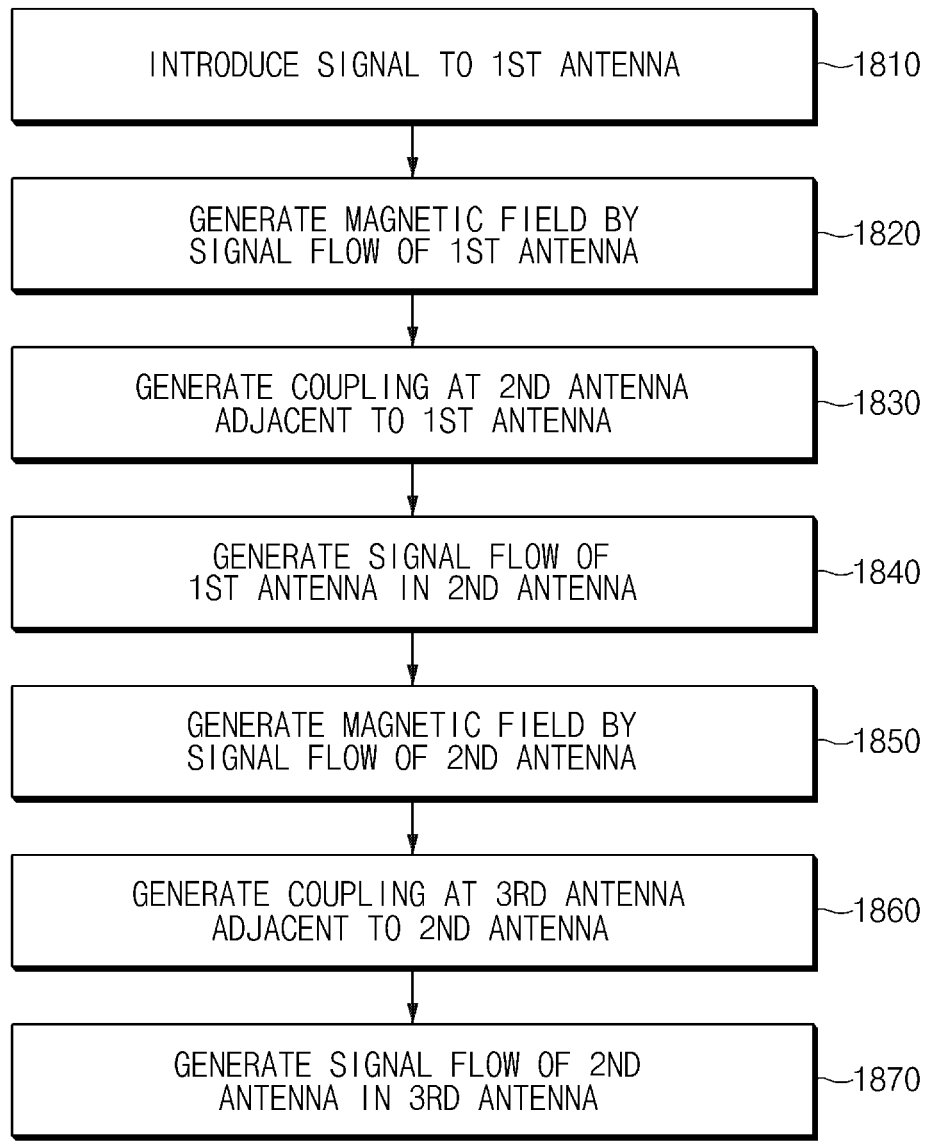
FIG. 18 is a flow chart illustrating a method of inducing a signal to one of three adjacent antennas, using a signal which is introduced into another antenna according to an embodiment of the present disclosure.

FIG. 18 is a flow chart illustrating a method of inducing a signal to one of three adjacent antennas, using a signal that is introduced into another antenna according to an embodiment of the present disclosure.

At operation 1810, a signal is introduced into a first antenna from an RF circuit from an LC matching part.

At operation 1820, a magnetic field is generated at the first antenna according to a flow of the signal that is induced in operation 1810.

At operation 1830, a coupling is generated at a second antenna adjacent to the first antenna in correspondence with the magnetic field generated in operation 1820.

At operation 1840, a signal flow is generated in the second antenna by the coupling generated during operation 1830.

At operation 1850, a magnetic field is generated at the second antenna according to a flow of the signal is generated in operation 1840.

At operation 1860, a third antenna adjacent to the second antenna is coupled with the magnetic field is generated in operation 1850.

At operation 1870, a signal flow is generated in the third antenna by the coupling generated during operation 1860.

Figure 19:
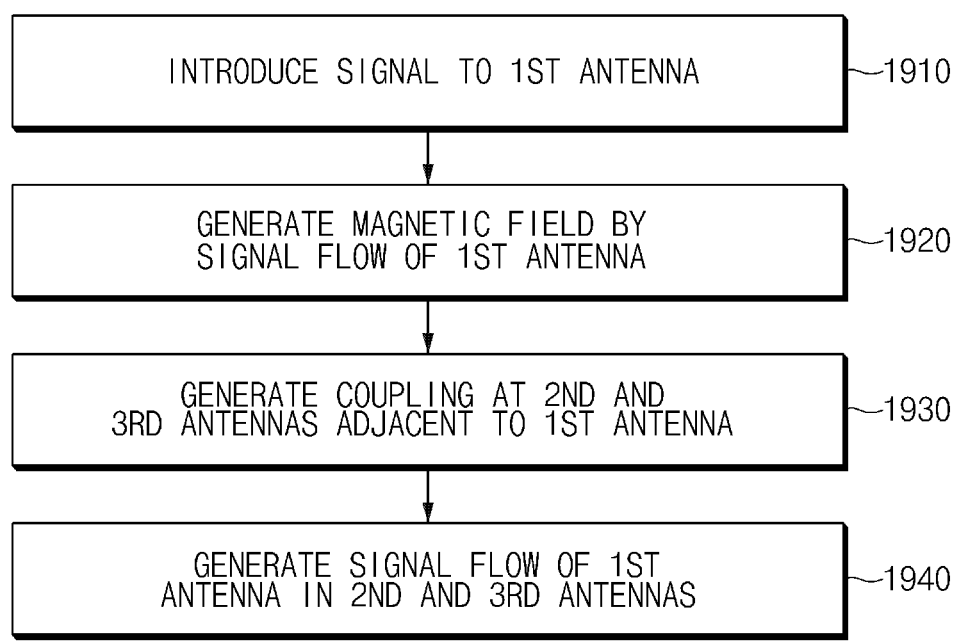
FIG. 19 is a flow chart illustrating a method of inducing a signal to one of three adjacent antennas, using a signal which is introduced into another antenna according to an embodiment of the present disclosure.

FIG. 19 is a flow chart illustrating a method of inducing a signal to one of three adjacent antennas, using a signal that is introduced into another antenna according to an embodiment of the present disclosure.

At operation 1910, a signal is introduced into a first antenna from an RF circuit from an LC matching part.

At operation 1920, a magnetic field is generated at the first antenna according to a flow of the signal induced in operation 1910.

At operation 1930, a coupling is generated at a second antenna and a third antenna, those of which are adjacent to the first antenna, in correspondence with the magnetic field generated in operation 1820.

At operation 1940, a signal flow is generated in the second antenna and the third antenna by the coupling generated during operation 1930.

Figure 20:
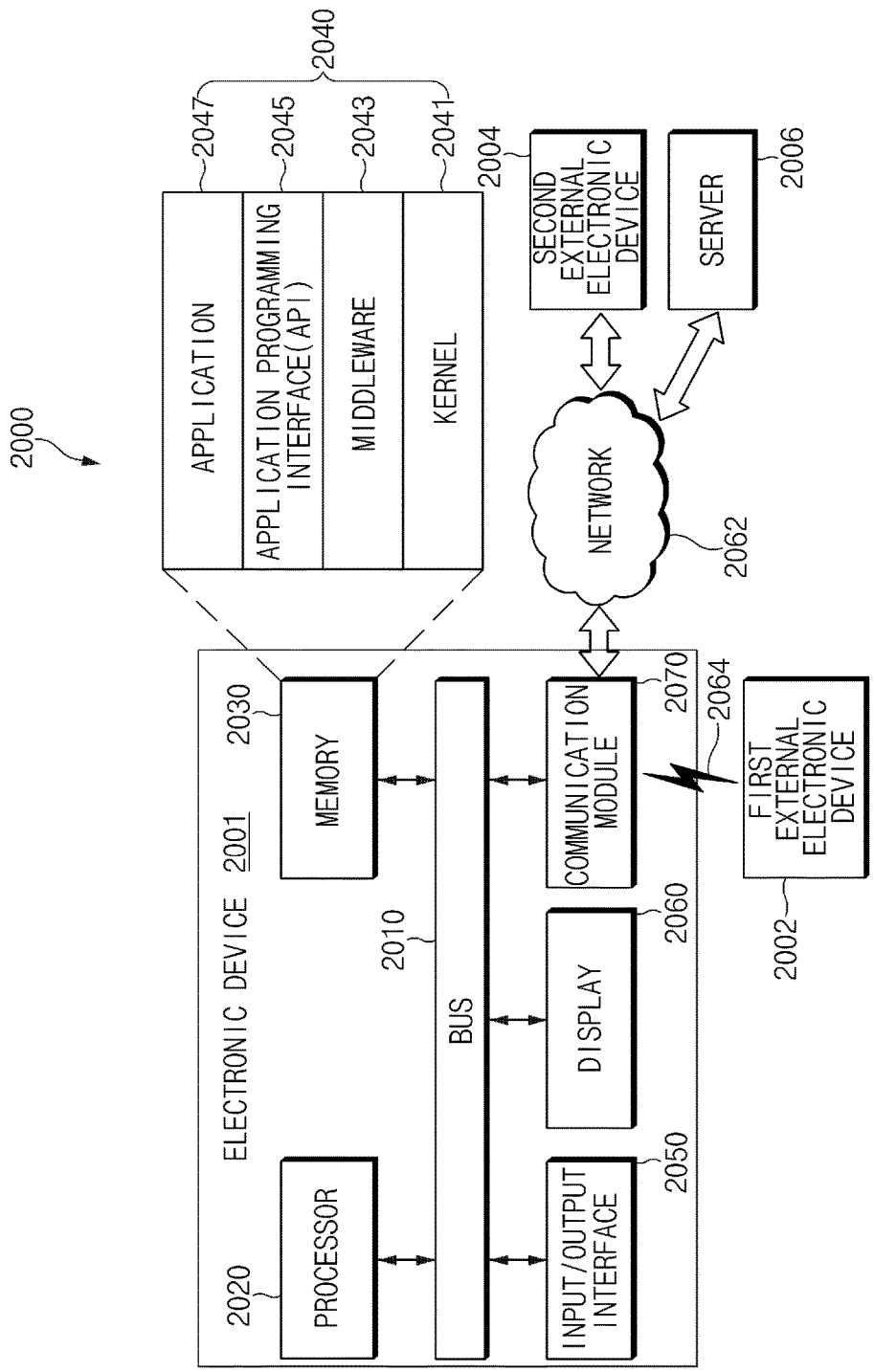
FIG. 20 is a block diagram illustrating an electronic device in a network environment according to an embodiment of the present disclosure.

FIG. 20 is a diagram illustrating an electronic device in a network environment according to an embodiment of the present disclosure.

Referring to FIG. 20, an electronic device 2001 included in a network 200 includes a bus 2010, a processor 2020, a memory 2030, an input/output (I/O) interface 2050, a display 2060, and a communication interface 2070. The electronic device 2001 may exclude at least one of the elements therefrom or further include another element therein, in accordance with embodiments of the present disclosure.

The bus 2010, for example, may include a circuit for connecting the elements 2010-2070 to each other and relaying communication (control messages and/or data) between these elements.

The processor 2020 may include at least one of a central processing unit (CPU), an application processor (AP), or a communication processor (CP). The processor 2020, for example, may execute computation or data operation for control and/or communication of other elements of at least one of the electronic device 2001.

The memory 2030 may include a volatile and/or nonvolatile memory. The memory 2030 may store, for example, instructions or data which are involved in at least one of other elements in the electronic device 2001. According to an embodiment of the present disclosure, the memory 2030 may store software and/or programs therein. The programs may include, for example, a kernel 2041, a middleware 2043, an application programming interface (API) 2045, and/or an application program (also referred to as an "application") 2047. At least a part of the kernel 2041, the middleware 2043, or the API 2045 may be referred to as an operation system (OS).

The kernel 2041 may control or manage, for example, system resources (e.g., the bus 2010, the processor 2020, or the memory 2030) that are used for executing operations or functions implemented in other programs (e.g., the middleware 2043, the API 2045, or the application program 2047). Additionally, the kernel 2041 may provide an interface capable of controlling or managing system resources by approaching individual elements of the electronic device 2001 from the middleware 2043, the API 2045, or the application program 2047.

The middleware 2043 may perform a mediating function to allow, for example, the API 2045 or the application program 2047 to communicate and exchange data with the kernel 2041.

Additionally, in relation to one or more work requests received from the application program 2047, the middleware 2043 may perform, for example, a control operation (e.g., scheduling or load balancing) for the work request by using a method of designating or arranging the priority, which permits the electronic device 2001 to use a system resource (e.g., the bus 2010, the processor 2020, or the memory 2030), into at least one of the application program 2047. For example, middleware 2043 may perform scheduling or load balancing operations for the one or more work requests by processing the one or more work requests according to the priority.

The API 2045 may be, for example, an interface for allowing the application 2047 to control a function which is provided from the kernel 2041 or the middleware 2043. For example, the API 2045 may include at least one interface or function (e.g., instructions) for file control, window control, or character control.

The input/output interface 2050 may act, for example, as an interface capable of transferring instructions or data, which are input from a user or another external device, to another element (or other elements) of the electronic device 2001. Additionally, the input/output interface 140 may output instructions or data, which are received from another element (or other elements) of the electronic device 2001, to a user or another external device.

The display 2060 may include, for example, a liquid crystal display (LCD), a light emitting diode (LED), an organic LED (OLED) display, a microelectromechanical system (MEMS) display, or an electronic paper. The display 2060 may display, for example, diverse contents (e.g., text, image, video, icon, or symbol) to a user. The display 2060 may include a touch screen, and may receive an input of touch, gesture, approach, or hovering made by using an electronic pen or a part of a user's body.

The communication interface 2070 may set, for example, a communication condition between the electronic device 2001 and an external electronic device (e.g., a first external electronic device 2002, a second external electronic device 2004, or a server 2006). For example, the communication interface 2070 may communicate with an external electronic device (e.g., the second external electronic device 2004 or the server 2006) in connection with a network 2062 through wireless communication or wired communication.

The wireless communication may use, for example, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). The wireless communication may include, for example, short range communication 2064. The short range communication 2064 may include, for example, at least one of WiFi, Bluetooth, near field communication (NFC), or global navigation satellite system (GNSS). GNSS may include, for example, at least one of global positioning system (GPS), global navigation satellite system (GLONASS), Beidou navigation system (hereinafter, "Beidou"), and Galileo (the European satellite-based navigation system). GPS and GNSS may be used interchangeably here. The wired communication may include, for example, at least one of universal serial bus (USB), high definition multimedia interface (HDMI), recommended standard 232 (RS-232), and plain old telephone service (POTS). The network 2062 may include a telecommunication network, for example, at least one of a computer network (e.g., a local area network (LAN) or a wireless LAN (WLAN)), Internet, or a telephone network.

Each of the first external electronic device 2002 and the second external electronic device 2004 may be a same or different type of electronic device as the electronic device 2001. According an embodiment of the present disclosure, the server 2006 may include a group of one or more servers. At least some of operations executed in the electronic device 2001 may be executed in another one or a plurality of electronic devices (e.g., the first external electronic device 2002, the second external electronic device 2004, or the server 2006). When there is a need to perform a function or service automatically or according to a request for the electronic device 2001, the electronic device 2001 may request at least a part of the function or service, additionally or instead of executing the function or service by itself, from another device (e.g., the first external electronic device 2002, the second external electronic device 2004, or the server 2006). Such another device (e.g., the first external electronic device 2002, the second external electronic device 2004, or the sever 2006) may execute a requested or additional function and then may transfer a result of the execution of the function to the electronic device 2001. The electronic device 2001 may process a received result, as-is, or may additionally provide the requested function or service. To this end, for example, it may be available to adopt a cloud computing, distributed computing, or client-server computing technique.

Figure 21:
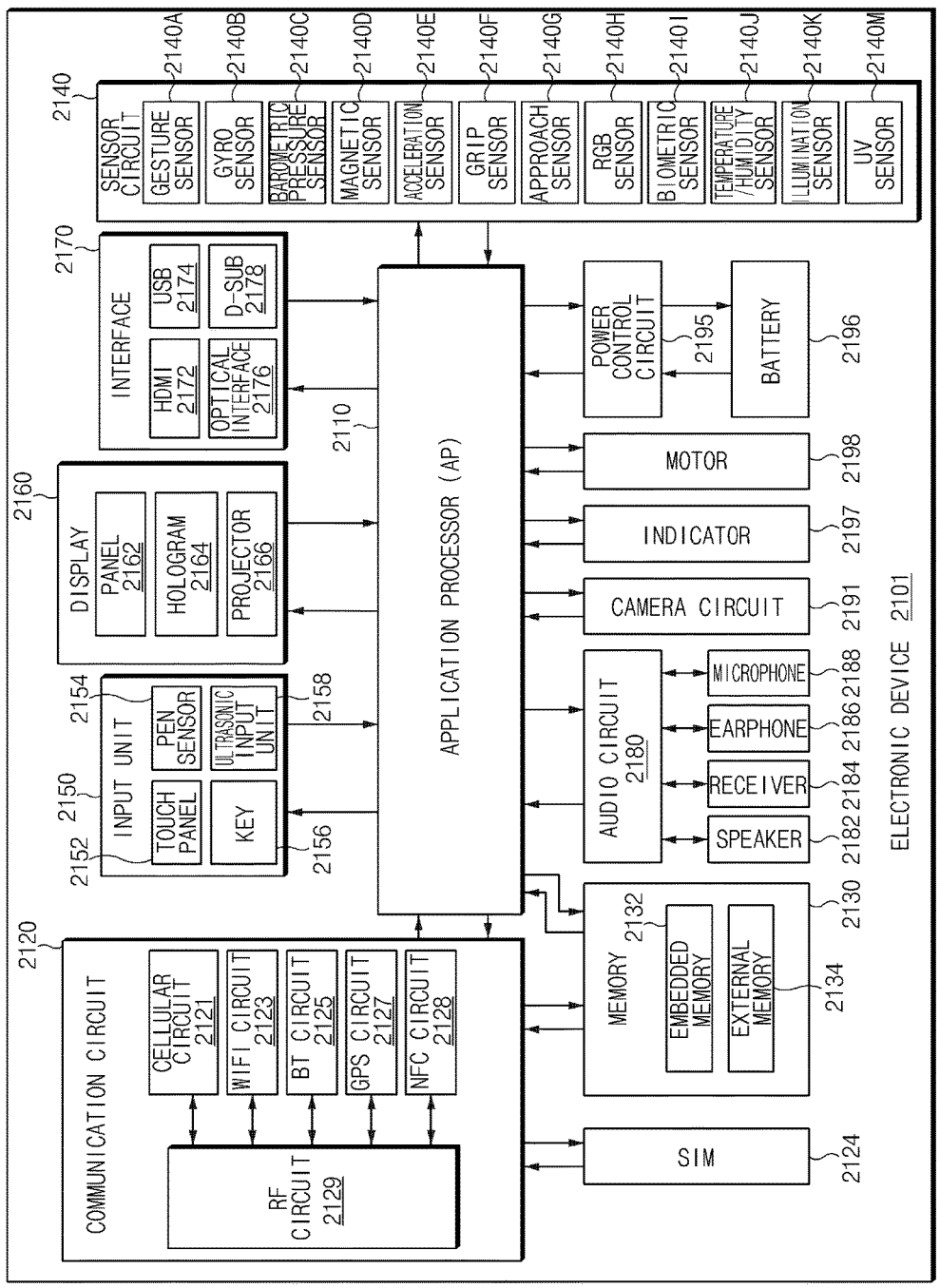
FIG. 21 is a block diagram illustrating an electronic device according to an embodiment of the present disclosure.

FIG. 21 is a block diagram illustrating an electronic device according to an embodiment of the present disclosure. The electronic device 2101 may include, for example, all or a part of elements of the electronic device 2001 shown in FIG. 20. The electronic device 2101 includes at least one application processor (AP) 2110, a communication circuit 2120, a subscriber identification circuit 2124, a memory 2130, a sensor circuit 2140, an input unit 2150, a display 2160, an interface 2170, an audio circuit 2180, a camera circuit 2191, a power management circuit 2195, a battery 2196, an indicator 2197, and a motor 2198.

The processor 2110 may drive an operating system (OS) or an application to control a plurality of hardware or software elements connected to the processor 2110 and may process and compute a variety of data including multimedia data. The processor 2110 may be implemented with a system-on-chip (SoC), for example. According to an embodiment of the present disclosure, the processor 2110 may further include a graphic processing unit (GPU) and/or an image signal processor. The processor 2110 may even include at least a part of the elements shown in FIG. 21. The processor 2110 may process instructions or data, which are received from at least one of other elements (e.g., a non-volatile memory), and then store diverse data into such a nonvolatile memory.

The communication circuit 2120 may have a configuration that is the same or similar to a configuration of the communication interface 2170 of FIG. 20. The communication circuit 2120 includes a cellular circuit 2121, a WiFi circuit 2123, a Bluetooth circuit 2125, a GNSS circuit (e.g., a GPS circuit, a GLONASS circuit, a Beidou circuit, or a Galileo circuit) 2127, an NFC circuit 2128, and an RF circuit 2129.

The cellular circuit 2121 may provide voice calls, video calls, a character service, or an Internet service through a communication network. According to an embodiment of the present disclosure, the cellular circuit 2121 may perform discrimination and authentication of an electronic device within a communication network using the subscriber identification module (SIM) 2124 (e.g., a SIM card). The cellular circuit 2121 may perform at least a portion of functions provided by the processor 2110. The cellular circuit 2121 may include a communication processor (CP).

Each of the WiFi circuit 2123, the Bluetooth circuit 2125, the GNSS circuit 827, or the NFC circuit 2128 may include, for example, a processor for processing data exchanged through a corresponding circuit. In some embodiments of the present disclosure, at least a part (e.g., two or more elements) of the cellular circuit 2121, the WiFi circuit 2123, the Bluetooth circuit 2125, the GNSS circuit 2127, and the NFC circuit 2128 may be included within one integrated circuit (IC) or an IC package.

The RF circuit 2129 may transmit and receive, for example, communication signals (e.g., RF signals). The RF circuit 2129 may include a transceiver, a power amplifier module (PAM), a frequency filter, a low noise amplifier (LNA), or an antenna. According to another embodiment of the present disclosure, at least one of the cellular circuit 2121, the WiFi circuit 2123, the Bluetooth circuit 2125, the GNSS circuit 2127, or the NFC circuit 2128 may transmit and receive an RF signal through an additional RF circuit.

The SIM 2124 may include, for example, a card that has a subscriber identification circuit, and/or an embedded SIM, and include unique identifying information (e.g., integrated circuit card identifier (ICCID)) or subscriber information (e.g., integrated mobile subscriber identify (IMSI)).

The memory 2130 includes, for example, an embedded memory 2132 or an external memory 2134. For example, the embedded memory 2132 may include at least one of a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.), a hard drive, and a solid state drive (SSD).

The external memory 2134 may further include a flash drive, for example, a compact flash (CF), a secure digital (SD), a micro-secure digital (SD), a mini-SD, an extreme digital (xD), or a memory stick. The external memory 2134 may be functionally connected with the electronic device 2101 through various interfaces.

The sensor circuit 2140 may measure, for example, a physical quantity, or detect an operation state of the electronic device 2101, to convert the measured or detected information to an electric signal. The sensor circuit 2140 includes a gesture sensor 2140A, a gyro sensor 2140B, a barometer pressure sensor 2140C, a magnetic sensor 2140D, an acceleration sensor 2140E, a grip sensor 2140F, a proximity sensor 2140G, a color sensor 2140H (e.g., red-green-blue (RGB) sensor), a biometric sensor 2140I, a temperature/humidity sensor 2140J, an illuminance sensor 2140K, or an UV sensor 2140M. Additionally or alternatively, the sensor circuit 2140 may include, for example, an E-nose sensor, an electromyography sensor (EMG) sensor, an electroencephalogram (EEG) sensor, an electrocardiogram (ECG) sensor, an infrared (IR) sensor, an iris sensor, or a fingerprint sensor. The sensor circuit 2140 may further include a control circuit for controlling at least one or more sensors included therein. In some embodiments, the electronic device 2101 may further include a processor, which is configured to control the sensor circuit 2140, as a part or additional element, thus controlling the sensor circuit 840 while the processor 2110 is in a sleep state.

The input unit 2150 may include, for example, a touch panel 2152, a (digital) pen sensor 2154, a key 2156, or an ultrasonic input unit 2158. The touch panel 2152 may recognize, for example, a touch input using at least one of a capacitive type, a resistive type, an infrared type, or an ultrasonic wave type. Additionally, the touch panel 2152 may further include a control circuit. The touch panel 2152 may further include a tactile layer to provide a tactile reaction for a user.

The (digital) pen sensor 2154 may be a part of the touch panel 2152, or an additional sheet for recognition. The key 2156, for example, may include a physical button, an optical key, or a keypad. The ultrasonic input unit 2158 may detect an ultrasonic wave, which is generated from an input tool, using a microphone (e.g., a microphone 2188), and may confirm data corresponding to the detected ultrasonic wave.

The display 2160 may include a panel 2162, a hologram device 2164, or a projector 2166. The panel 2162 may include the same or similar configuration with the display 2060 of FIG. 20. The panel 2162, for example, may be flexible, transparent, or wearable. The panel 2162 and the touch panel 2152 may be integrated in one circuit. The hologram device 2164 may show a three-dimensional image in a space using interference of light. The projector 2166 may project light onto a screen to display an image. The screen, for example, may be positioned in the inside or outside of the electronic device 2101. According to an embodiment of the present disclosure, the display 2160 may further include a control circuit for controlling the panel 2162, the hologram device 2164, or the projector 2166.

The interface 2170 includes a high-definition multimedia interface (HDMI) 2172, a USB 2174, an optical interface 2176, and a D-sub (D-subminiature) 2178. The interface 2170 may be included, for example, in the communication interface 2070 shown in FIG. 20. Additionally or alternatively, the interface 2170, for example, may include a mobile high definition link (MHL) interface, a secure digital (SD) card/multi-media card (MMC) interface, or an Infrared data association (IrDA) standard interface.

The audio circuit 2180 may convert a sound and an electric signal in dual directions. At least one element of the audio circuit 2180 may be included, for example, in the I/O interface 2045 shown in FIG. 20. The audio circuit 2180, for example, may process sound information that is input or output through the speaker 2182, the receiver 2184, the earphone 2186, or the microphone 2188.

The camera circuit 2191 may be capable of taking a still picture and a moving picture. According to an embodiment of the present disclosure, the camera circuit 2191 may include one or more image sensors (e.g., a front sensor or a rear sensor), a lens, an image signal processor (ISP), or a flash (e.g., an LED or a xenon lamp).

The power management circuit 2195 may manage, for example, power of the electronic device 2101. The power management circuit 2195 may include, for example, a power management integrated circuit (PMIC) a charger integrated circuit (IC), or a battery or fuel gauge. The PMIC may operate in a wired and/or a wireless charging mode. A wireless charging mode may include, for example, diverse types of magnetic resonance, magnetic induction, or electromagnetic wave. With respect to wireless charging, an additional circuit, such as a coil loop circuit, a resonance circuit, or a rectifier, may be further included therein. The battery gauge, for example, may measure a remnant of the battery 2196, a voltage, a current, or a temperature during charging. The battery 2196 may measure, for example, a residual, a voltage on charge, a current, or temperature thereof. The battery 2196 may include, for example, a rechargeable battery and/or a solar battery.

The indicator 2197 may display the following specific states of the electronic device 2101 or a part (e.g., the processor 2110) thereof: a booting state, a message state, or a charging state. The motor 2198 may convert an electric signal into mechanical vibration and generate a vibration or haptic effect. The electronic device 2100 may include a processing unit (e.g., a GPU) for supporting mobile TV. The processing unit for supporting mobile TV, for example, may process media data that is based on the standard of digital multimedia broadcasting (DMB), digital video broadcasting (DVB), or media flow (MediaFlo™).

Each of the above-described elements of the electronic device according to an embodiment of the present disclosure may be implemented using one or more components, and a name of a relevant component may vary with on the kind of the electronic device. The electronic device according to an embodiment of the present disclosure may include at least one of the above components. Some of the components may be omitted, or additional other components may be further included. Some of the components of the electronic device according to embodiments of present disclosure may be combined to form one entity, thereby making it possible to perform the functions of the relevant components substantially the same as before the combination.

Figure 22:
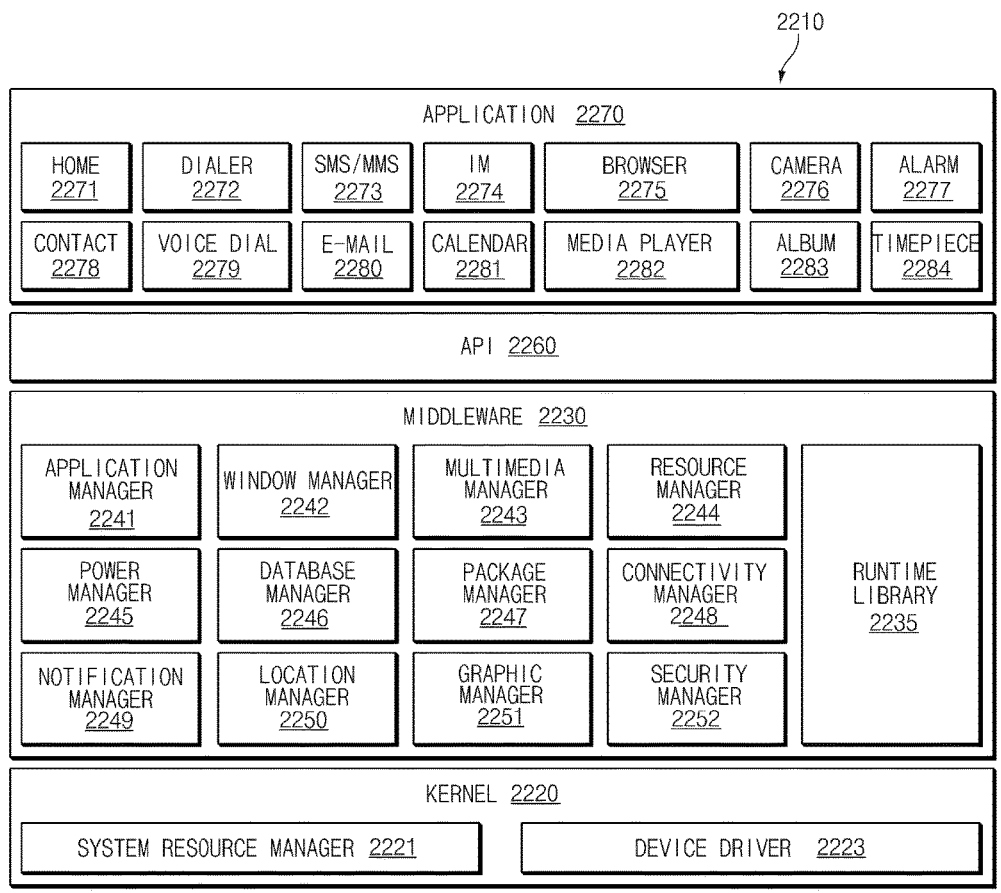
FIG. 22 is a block diagram illustrating a program module according to an embodiment of the present disclosure.

FIG. 22 is a block diagram illustrating a program module according to an embodiment of the present disclosure.

Referring to FIG. 22, the program module (e.g., the program 2040) 2210 may include an operating system (OS) to control resources relevant to an electronic device (e.g., the electronic device 2001), and/or diverse applications (e.g., the application program 2047) driven on the operating system. The operating system may be, for example, Android, iOS, Windows, Symbian, Tizen, or Bada.

The program module 2210 may include a kernel 2220, a middleware 2230, and an API 2260. At least a part of the program module 2210 may be preloaded on an electronic device, or may be downloadable from another electronic device (e.g., the first external electronic device 2002, the second external electronic device 2004, or the server 1006).

The kernel 2220 includes a system resource manager 2221 or a device driver 2223. The system resource manager 2221 may perform control, allocation, or retrieval of system resources. According to an embodiment of the present disclosure, the system resource manager 2221 may include a process managing part, a memory managing part, or a file system managing part. The device driver 2223 may include, for example, a display driver, a camera driver, a Bluetooth driver, a common memory driver, an USB driver, a keypad driver, a WiFi driver, an audio driver, or an inter-process communication (IPC) driver.

The middleware 2230 may provide a function necessary for the application 2270 in common, or provide diverse functions to the application 2270 through the API 2260 to allow the application 2270 to efficiently use limited system resources of the electronic device. According to an embodiment of the present disclosure, the middleware 2230 includes a runtime library 2235, an application manager 2241, a window manager 2242, a multimedia manager 2243, a resource manager 2244, a power manager 2245, a database manager 2246, a package manager 2247, a connectivity manager 2248, a notification manager 2249, a location manager 2250, a graphic manager 2251, and a security manager 2252.

The runtime library 2235 may include a library module that is used by a compiler to add a new function through a programming language while the application 2270 is being executed. The runtime library 2235 may perform input/output management, memory management, or capacities about arithmetic functions.

The application manager 2241 may manage a life cycle of at least one of the application 2270. The window manager 2242 may manage a GUI resource that is used in a screen. The multimedia manager 2243 may identify a format necessary for playing diverse media files, and perform encoding or decoding for media files by using a CODEC suitable for the format. The resource manager 2244 may manage resources such as storage space, memory, or source code of at least one application of the applications 2270.

The power manager 2245, for example, may operate with a basic input/output system (BIOS) to manage a battery or power, and provide power information for an operation of an electronic device. The database manager 946 may generate, search, or modify a database used in at least one application of the application 2270. The package manager 947 may install or update an application that is distributed in a form of package file.

The connectivity manager 2248 may manage, for example, wireless connection such as WiFi or Bluetooth. The notification manager 2249 may display or notify an event such as arrival message, promise, or proximity notification in a mode that does not disturb a user. The location manager 2250 may manage location information of an electronic device. The graphic manager 2251 may manage a graphic effect that is provided to a user, or manage a user interface relevant thereto. The security manager 2252 may provide a general security function necessary for system security or user authentication. According to an embodiment of the present disclosure, if the electronic device 100 includes a telephony function, the middleware 2230 may further includes a telephony manager for managing a voice or image call function of the electronic device.

The middleware 2230 may include a middleware module to form a combination of diverse functions of the above-described elements. The middleware 2230 may provide a specialized module by a kind of OS in purpose of offering differentiated functions. Additionally, the middleware 2230 may remove a part of the preexisting elements, dynamically, or add a new element thereto.

The API 2260 (e.g., the API 2045) may be a set of programming functions, and may be provided in a configuration which is variable depending on an OS. For example, for Android or iOS, it may be permissible to provide one API set per platform. When using Tizen, it may be permissible to two or more API sets per platform.

The application 2270 (e.g., the application program 2047) includes, for example, one or more applications capable of providing functions for a home 2271, a dialer 2272, an SMS/MMS 2273, an instant message (IM) 2274, a browser 2275, a camera 2276, an alarm 2277, a contact 2278, a voice dial 2279, an e-mail 2280, a calendar 2281, a media player 2282, am album 2283, and a timepiece 2284, or for offering health care (e.g., measuring an exercise quantity or blood sugar level) or environmental information (e.g., atmospheric pressure, humidity, or temperature).

According to an embodiment of the present disclosure, the application 2270 may include an application (hereinafter, referred to as an "information exchanging application" for descriptive convenience) to support information exchange between the electronic device 2001 and the first external electronic device 2002 and the second external electronic device 2004. The information exchanging application may include, for example, a notification relay application for transmitting specific information to the external electronic device, or a device management application for managing the external electronic device.

The information exchanging application may include a function of transmitting notification information, which arise from other applications (e.g., the applications for SMS/MMS, e-mail, health care, or environmental information), to the first external electronic device 2002 and the second external electronic device 2004. Additionally, the information exchanging application, for example, may receive notification information from an external electronic device and provide the notification information to a user.

The device management application may manage (e.g., install, delete, or update), for example, at least one function (e.g., turn-on/turn-off an external electronic device itself (or a portion of components thereof) or adjustment of brightness (or resolution) of a display) of other electronic devices that communicate with the electronic device 2001, an application operating in the external electronic device, or service (e.g., call service or message service) provided from an external electronic device.

According to an embodiment of the present disclosure, the application 2270 may include an application (e.g., a health care application of a mobile medical device) that is assigned thereto according to the properties of the first external electronic device 2002 and the second external electronic device 2004. The application 2270 may include an application that is received from the first external electronic device 2002, the second external electronic device 2004, or the server 2006. The application 2270 may include a preloaded application or a third party application that is downloadable from a server. The titles of the program module 2210 may be modifiable depending on the OS.

According to an embodiment of the present disclosure, at least a part of the program module 2210 may be implemented in software, firmware, hardware, or a combination of at least two thereof. At least a part of the program module 2210, for example, may be implemented (e.g., executed) by the processor 2110. At least a part of the program module 2210 may include, for example, a module, a program, routine, a set of instructions, or a process for performing one or more functions.

A wearable electronic device according to an embodiment of the present disclosure may include a first cover forming the front of the electronic device; a second cover forming the rear of the electronic device; a memory at least partly included in a space between the first cover and the second cover; a display unit included in the space and exposed through the first cover; a processor included in the space and electrically connected with the memory; and an antenna included in the space and electrically connected with the processor, wherein the memory, during execution of instructions, may include instructions allowing the processor to store payment information in the memory, allowing the processor, at least partly responding to a user's input, to display at least one of images and/or texts on the display unit and to determine a start of a payment process using the electronic device, and allowing the processor, according to the determination of the start of the payment process, to transmit a signal of the payment information through the antenna and to read the payment information by an external electronic device.

According to an embodiment of the present disclosure, a wearable electronic device may provide functionality of allowing near field communication (NFC) without separation from a user.

According to an embodiment of the present disclosure, a wearable electronic device may include a wireless charging pad for providing convenience of charging without an additional insertion connector.

While the present disclosure has been shown and described with reference to certain embodiments thereof, it will be understood by those having ordinary skill in the art that various changes in form and details may be made therein without departing from the spirit and scope of the present disclosure as defined by the following claims and their equivalents.

What is claimed is:

1. An electronic device comprising:
   a body case enclosing a space between a first surface and a second surface opposite to the first surface and including a metallic material so as to perform an antenna function;
   a printed circuit board disposed in a space between the first surface and the second surface and forming a surface substantially parallel to the first surface;
   at least one contact element included in a side of a bracket connecting the body case and the printed circuit board, wherein the at least one contact element includes the metallic material;
   a first communication circuit included in the printed circuit board, electrically connected to the body case, and configured to, by using a mobile communication protocol, transmit a first signal through the body case;
   a second communication circuit included in the printed circuit board, and configured to transmit a second signal by using a near field communication (NFC) protocol; and
   a display disposed between the first surface and the printed circuit board, wherein the display comprises:
      a display panel and a display control circuit; and
      an antenna pattern disposed between the display panel and the display control circuit, wherein the antenna pattern forms a surface substantially parallel to the display panel,
      wherein the second signal generated from the second communication circuit is electrically connected to the body case through the at least one contact element, and then induced to the antenna pattern through a magnetic field from the body case.

2. The electronic device of claim 1, further comprising:
   a metallic pattern disposed between the printed circuit board and the second surface; and
   a charging circuit electrically connected to the metallic pattern.

3. The electronic device of claim 1, wherein the second communication circuit is further configured to use a magnetic secure transmission (MST) protocol.

4. The electronic device of claim 1, wherein at least one of the first surface and the second surface is formed of a nonmetallic material.

5. The electronic device of claim 4, further comprising:
   a nonconductive bracket on which the printed circuit board is staked; and
   a flange structure disposed between the nonmetallic material and the display panel.

6. The electronic device of claim 5, wherein at least a part of the flange structure is stacked interposing a waterproof tape or waterproof liquid solution.

7. The electronic device of claim 1, wherein at least a part of a metallic material of the body case is electromagnetically coupled to the second communication circuit.

8. The electronic device of claim 1, wherein at least a part of a metallic material of the body case is electromagnetically coupled to the antenna pattern.

9. The electronic device of claim 1, further comprising:
   a processor and a memory electrically connected to the processor,
   wherein the memory, during execution of instructions, is configured to store the instructions allowing the processor to receive another signal through the antenna pattern and to provide image data to the display panel.

10. The electronic device of claim 1,
    wherein the display control circuit is a flexible printed circuit board (FPCB) layer of the display.

11. The electronic device of claim 1, wherein the electronic device is a wearable electronic device.

12. The electronic device of claim 1, further comprising:
    a second antenna pattern electrically connected to the second communication circuit,
    wherein the antenna pattern and the second antenna pattern are coupled to each other.

13. The electronic device of claim 12, wherein the second communication circuit transmits the second signal to the antenna pattern, and
    wherein the antenna pattern induces a coupling signal to the second antenna pattern based on the second signal.

14. The electronic device of claim 12, wherein the second communication circuit transmits the second signal to the second antenna pattern, and
   wherein the second antenna pattern induces a coupling signal to the antenna pattern based on the second signal.

* * * * *